US012234129B2

(12) United States Patent
Hooftman et al.

(10) Patent No.: US 12,234,129 B2
(45) Date of Patent: Feb. 25, 2025

(54) SYSTEM OF A CRANE AND AN EXCHANGEABLE TOOL

(71) Applicant: ITREC B.V., Schiedam (NL)

(72) Inventors: Maarten Hugo Hooftman, Schiedam (NL); Cornelis Martinus Van Veluw, Schiedam (NL); Terence Willem August Vehmeijer, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 18/443,050

(22) Filed: Feb. 15, 2024

(65) Prior Publication Data

US 2024/0182271 A1  Jun. 6, 2024

Related U.S. Application Data

(62) Division of application No. 17/275,259, filed as application No. PCT/NL2019/050591 on Sep. 12, 2019, now Pat. No. 11,939,191.

(30) Foreign Application Priority Data

Sep. 12, 2018 (NL) ........................................ 2021614
May 1, 2019 (NL) ........................................ 2023047

(51) Int. Cl.
*B66C 13/00* (2006.01)
*B66C 23/62* (2006.01)
(Continued)

(52) U.S. Cl.
CPC .............. *B66C 13/00* (2013.01); *B66C 23/62* (2013.01); *B66C 23/88* (2013.01); *F16B 2/06* (2013.01); *B66C 23/52* (2013.01)

(58) Field of Classification Search
CPC ......... B66C 23/52; B66C 23/60; B66C 23/62; B66C 23/82; B66C 23/88; B66C 13/00; F16B 2/06; B25J 15/0433; B25J 15/0458
See application file for complete search history.

(56) References Cited

U.S. PATENT DOCUMENTS 2,397,554 A  4/1946  Lontz
3,786,935 A  1/1974  Vlazny et al.
(Continued)

FOREIGN PATENT DOCUMENTS

EP  2 088 114 A1  8/2009
EP  2 932 517 B1  7/2018
(Continued)

OTHER PUBLICATIONS

Dutch Search Report, issued in Priority Application No. 2023047, dated Oct. 14, 2019.
(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A system comprising a crane and an exchangeable tool. The crane and the tool respectively comprise an upper tool connector with tool retainers and a lower tool connector which can be interconnected, e.g. a male and female connector, e.g. the lower tool connector of the tool being embodied as a shank provided with a shoulder and the upper tool connector as a tool clamp with a female, open-centered body. A tool suspension device comprises the upper tool connector. a travelling block member. The tool clamp has multiple mobile tool retainers adapted to—in a non-operative position—allow introduction of the shank of the tool from below into the shank receiving passage and—in an operative position—engage below the shoulder of the shank that has been introduced into the passage so as to suspend the tool. The upper tool connector may comprise a bearing allowing for swivelling of the open-centered body, and e.g. a rotational drive operative between the clamp housing and
(Continued)

the female, open-centered body to actively drive said swivelling.

20 Claims, 25 Drawing Sheets

(51) Int. Cl.
 _B66C 23/88_ (2006.01)
 _F16B 2/06_ (2006.01)
 _B66C 23/52_ (2006.01)

(56) References Cited

U.S. PATENT DOCUMENTS

| | | | |
|---|---|---|---|
| 6,257,636 | B1 | 7/2001 | Hovis et al. |
| 7,328,811 | B2 | 2/2008 | Roodenburg et al. |
| 9,463,963 | B2 | 10/2016 | Hey |
| 11,939,191 | B2 * | 3/2024 | Hooftman ................. B66C 1/34 |
| 2013/0168345 | A1 | 7/2013 | Hey |
| 2016/0376132 | A1 | 12/2016 | Hey |

FOREIGN PATENT DOCUMENTS

| | | |
|---|---|---|
| EP | 3 022 361 B2 | 9/2020 |
| GB | 2 417 233 A | 2/2006 |
| JP | S48-2955 U | 1/1973 |
| SE | 427 346 B | 3/1983 |
| WO | WO 2009/099319 A1 | 8/2009 |
| WO | WO 2013/114065 A2 | 8/2013 |
| WO | WO 2018/139918 A1 | 8/2018 |
| WO | WO 2018/139931 A1 | 8/2018 |

OTHER PUBLICATIONS

International Search Report, issued in PCT/NL2019/050591, dated Jan. 10, 2020.
Written Opinion of the International Searching Authority, issued in PCT/NL2019/050591, dated Jan. 10, 2020.
European Communication pursuant to Article 94(3) EPC for European Application No. 19782790.0, dated Oct. 4, 2024.

* cited by examiner

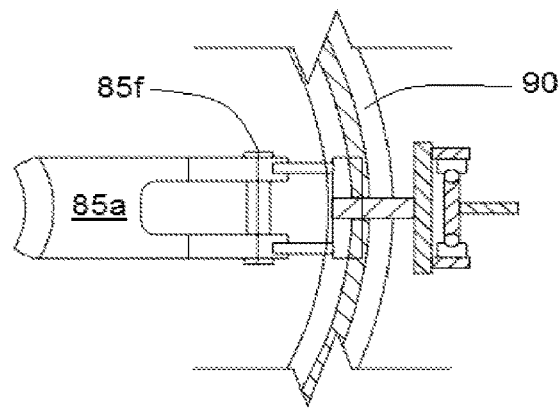 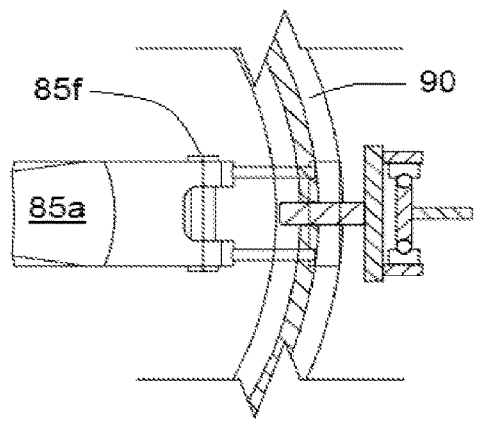
Fig.7A        Fig.7B
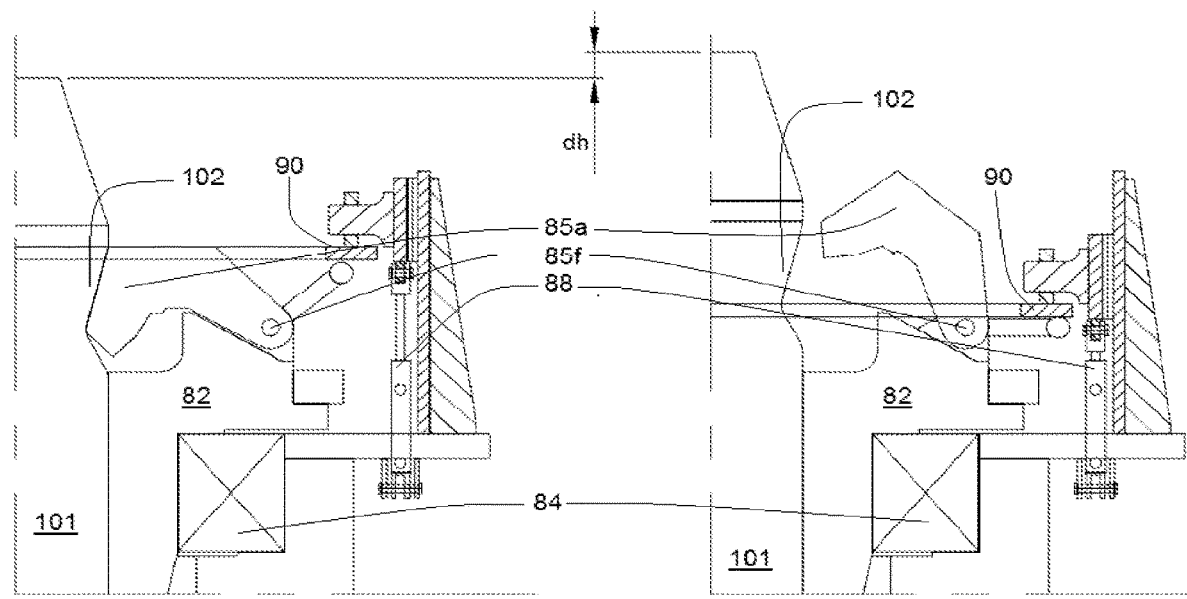
Fig.7C        Fig.7D

SYSTEM OF A CRANE AND AN EXCHANGEABLE TOOL

CROSS-REFERENCE TO RELATED APPLICATIONS

This application is a Divisional of application Ser. No. 17/275,259, filed on Mar. 11, 2021, which is a National Phase of PCT International Application No. PCT/NL2019/050591, filed on Sep. 12, 2019, which claims priority under 35 U.S.C. § 119(a) to Patent Application Nos. 2021614 and 2023047 filed in the Netherlands on Sep. 12, 2018 and May 1, 2019, respectively. All of the above applications are hereby expressly incorporated by reference into the present application.

FIELD OF THE INVENTION

The invention relates to the field of cranes.

BACKGROUND OF THE INVENTION

For example, WO2009099319 discloses a vessel provided with a crane, wherein the crane comprises a revolving structure, a boom that is pivotally mounted to the revolving structure, and a luffing assembly configured for luffing of the boom. The crane further comprises a hoist assembly with one or more hoist winches, one or more hoist cables driven by the one or more hoist winches, and a travelling block member suspended from the one or more winch driven hoist cables of the hoist assembly. The travelling block member has multiple cable sheaves and is provided with a crane hook assembly, in the example of FIG. 6 with two ramshorn hooks that are connected via a common and freely swivelling carrier to the travelling block member.

The hoist assembly of a vessel mounted crane may be provided with heave compensation to allow for compensation of heave motion, e.g. by embodying the hoist winch as an AHC winch or by means of one or more heave compensating cylinders and one or more associated cable sheaves acting on a section of the hoist cable.

Generally, for example in WO2009099319 and in many existing cranes, the crane hook assembly is permanently fitted on the travelling block, at least in a manner that is not attractive in view of exchanging the crane hook assembly for another crane hook assembly. If the crane is to be used for hoisting different loads, commonly use is made of wire slings between the crane hook and the object, e.g. with an intermediate spreader or the like.

WO2018/139931 discloses an arrangement that allows for easier coupling and decoupling of a tool to the travelling block of the crane, for example the tool being a crane hook. Thereto a suspension device is disclosed in WO2018/139931.

OBJECT OF THE INVENTION

It is object of the invention to provide at least an alternative for the device of WO2018/139931.

It is a further object of the invention to provide an improved, e.g. a more versatile and/or robust solution.

SUMMARY OF THE INVENTION

In a first aspect thereof, the present invention proposes a system comprising a crane and an exchangeable tool.

The first aspect of the invention also relates to a system comprising a crane and an exchangeable tool. The variations may be applied to this system as well, providing the same advantages.

The first aspect of the invention also relates to a system comprising a tool suspension device and an exchangeable tool, and a tool suspension device according. The variations are applicable thereto as well, providing the same advantages. The first aspect also relates to a use of the tool suspension device.

The first aspect of the invention also relates to a system comprising an exchangeable tool and an upper tool connector. The variations are applicable thereto as well, providing the same advantages.

The first aspect of the invention also relates to an exchangeable tool, and to an upper tool connector.

The first aspect of the invention also relates to a method.

In a second aspect thereof, the present invention proposes that the upper tool connector is embodied as a tool clamp, and the lower tool connector as a shank provided with a shoulder.

The tool clamp is configured to releasably engage on the shank of the exchangeable tool, and has for this purpose a specific advantageous construction, as will be described herein.

In either aspect, the system may for example include a set of one or more exchangeable tools, which set may include one or more crane hooks or other lifting tool from which a load is to be suspended, for example a foundation pile top end lifting device, a lifting device for a transition piece of an offshore wind turbine, a foundation pile upending device, a monopile upending and lifting tool, a pile driver lifting tool, etc. When all these exchangeable tools are provided with the same lower tool connector, they are advantageously connectable to the same upper tool connector of the crane. As such, the tools are exchangeable while through the same upper tool connector of the crane.

The system may comprise one or more exchangeable tools that each have one functionality, e.g. like a crane hook, but may also comprise one or more tools that are each embodied to provide for multiple functionalities, e.g. a multi-tool as described in WO2018/139918.

The system may comprise one or more exchangeable tools that are embodied as pile driving devices, e.g. having a drop hammer and an anvil or embodied as in discussed in EP3022361.

The system may comprise on or more exchangeable tools that are embodied with a spreader configured for lifting freight containers, the spreader having a four cornered lifting frame and a locking mechanism at each corner that is configured to releasably attach to a corner fitting of the freight container.

The system may comprise one or more exchangeable tools that are embodied with an excavator device, e.g. a dredging bucket, e.g. for underwater dredging operations, e.g. a clamshell dredging bucket.

The system may comprise one or more exchangeable tools that are embodied with an subsea trenching device and/or underwater cable lay device configured to make a trench in the bottom of a body of water and/or lay an underwater cable.

The system may comprise one or more exchangeable tools that are configured for subsea pipe cutting, e.g. comprising a cutting shear or a continuous loop wire cutting device.

The system may comprise one or more exchangeable tools that are embodied with a underwater rock placement device, e.g. a grab device, configured for placement of rocks on the bottom of a body of water.

The system may comprise one or more exchangeable tools that are embodied with a launch system to deploy and recover an underwater ROV.

The system may also be embodied and used to install a subsea component, e.g. on the seabed. Herein it is envisaged that the system comprises, in addition to one or more exchangeable tools, a subsea component, wherein the subsea component is provided with the shank provided with the shoulder as described herein in relation to an exchangeable tool. For example, the subsea component is a subsea template, a pile guide device for guiding a pile to be driven into the subsea bottom, a suction anchor, a flow line component (e.g. a flow line end terminal component), a wellhead component, etc.

Preferably, the system comprises multiple exchangeable tools, e.g. each having a different functionality and/or a different capacity (e.g., crane hooks with different lifting capacity), which tools all have a shank and shoulder configured to be mated with the same tool clamp. This allows for a method wherein a first of said multiple exchangeable tools is disconnected from the upper tool connector and a second tool of said multiple exchangeable tools is connected to the same upper tool connector, without making alterations to the upper tool connector.

In an embodiment, the lower tool connector is non-releasable from the tool, e.g. integral with the tool.

For example, the lower tool connector is part of a crane hook, e.g. a ramshorn crane hook or a four pronged crane hook.

For example, the lower tool connector is embodied to support a vertical load of over 500 tonnes, e.g. over 1000 tonnes, e.g. of about 5000 tonnes in embodiments.

In embodiments according to the first aspect of the invention, the travelling block member comprises one or more fixed support elements, for example one or more recesses and/or inward protrusions. The fixed support elements are arranged below the mobile tool retainers of the upper tool connector, and are configured to support the upper tool connector body, and therewith, the upper tool connector. The fixed support elements absorb the load of the suspended tool, and any load supported by the tool, below the mobile tool retainers suspending the tool. The support of the upper tool connector by the travelling block member being located below the support of the tool by the upper tool connector— namely by the tool retainers thereof, may advantageously provide a compact arrangement of the tool suspension device; the height needed for the suspension of the tool underneath the tool suspension device may be minimized relative to arrangements wherein the support of the tool is below the support of the upper connector. Furthermore, it may result in improved control of movements of the tool. Undesired movements thereof, e.g. undesired swinging or slewing movements, may more effectively be damped, and control of intended movements, e.g. pivoting or swivelling movements, may be improved.

In embodiments the travelling block member of the tool suspension device comprises a travelling block outer frame, which defines an outer contour of the travelling block member. The travelling block outer frame is provided with one or more fixed support elements, for instance one or more recesses and/or one or more inward protrusions. These fixed support elements are configured to support the upper tool connector body of the upper tool connector such as to retain the upper tool connector substantially within the outer contour of the travelling block member. As such, the upper tool connector can advantageously be integrated in the tool suspension device, such as to form an integral part of the crane.

In embodiments, the travelling block outer frame of the travelling block member comprises two traverse frame elements, for instance two vertically parallel traverse frame plate elements, e.g. below the cable sheaves, or partly or completely sandwiching them. When seen in a top view of the tool suspension device, these frame plate elements horizontally enclose one or more cable sheaves of the travelling block member and the upper tool connector. Both traverse frame elements comprise the one or more fixed support elements. For instance, these are provided horizontally opposite one another, for instance inwardly facing each other. The cable sheaves enable a suspension of the tool suspension device by the one or more winch driven cables in a multiple fall arrangement.

In embodiments the fixed support elements are configured to pivotally support the upper tool connector body such as to retain the upper tool connector pivotally with respect to the travelling block outer frame around a substantially horizontal connector pivot axis extending through the travelling block outer frame. This configuration is such as to allow a pivoting of the upper tool connector around the connector pivot axis while absorbing the load of the suspended tool and any load supported by the tool.

For example, the upper tool connector body may comprises horizontally aligned and axle ends, which are supported within associated respective recesses of the travelling block outer frame. These axle ends and recesses are arranged along the connector pivot axis at opposed sides of the connector body. For instance two traverse outer frame elements, e.g. two vertically parallel traverse outer frame plate elements, comprise the recesses. The axle ends may for instance run in bearings provided within said recesses.

In embodiments the support elements support the upper tool connector—when seen in a top view of the tool suspension device—horizontally in between the cable sheaves of the travelling block member. For example the support elements support the upper tool connector within a space enclosed by the traverse outer frame elements, and optionally said cable sheaves, that allows pivoting of the upper tool connector around the connector pivot axis, e.g. by at least 1°.

In a second aspect thereof, the present invention proposes that the upper tool connector is embodied as a tool clamp, and the lower tool connector as a shank provided with a shoulder.

The shank with the shoulder is a very simple structure that can be easily and robustly implemented in a variety of tools. The shank is sturdy and requires no specific maintenance, e.g. as the shank itself requires no moving components for its mechanical connection to the tool clamp.

The tool clamp is configured to releasably engage on the shank of the exchangeable tool, and has for this purpose a specific advantageous construction. It comprises:
an upper connector body embodied as a clamp housing, supported by the travelling block member,
a female, open-centered body defining a shank receiving passage with a central vertical axis allowing introduction of the shank of the tool into the passage from below, and
multiple mobile tool retainers.

The mobile tool retainers are mounted on the female, open-centered body. The mobile tool retainers are distributed around the shank receiving passage, preferably about an open top end of said shank receiving passage, so as to each provide an operative and a non-operative position of the mobile tool retainer. The mobile tool retainers are adapted to—in a non-operative position thereof—allow introduction of the shank of the tool from below into the shank receiving passage. The mobile tool retainers are furthermore adapted to—an operative position thereof—engage the shank below the shoulder of the shank that has been introduced into the passage so as to suspend the tool from the tool clamp underneath the tool suspension device.

In particular the second aspect relates to a system comprising a crane and an exchangeable tool, for example for use on a vessel, wherein the exchangeable tool comprises, at an upper side thereof, a lower tool connector embodied as a shank provided with a shoulder.

The crane may therein comprise a revolving structure, a boom, pivotally mounted to the revolving structure, a luffing assembly configured for luffing of the boom, and
- a hoist assembly. The hoist assembly may comprise one or more hoist winches, and one or more hoist cables driven by the one or more hoist winches.

The crane comprises a tool suspension device. The tool suspension device comprises a travelling block member suspended from the one or more winch driven hoist cables of the hoist assembly, and the tool clamp. The travelling block member of the tool suspension device is adapted to support the tool clamp and absorb the load of the suspended tool and any load supported by the tool.

The second aspect of the invention also relates to a system comprising a crane and an exchangeable tool, e.g. for use on a vessel, wherein the exchangeable tool comprises, at an upper side thereof, a shank provided with a shoulder, wherein the crane comprises a tool suspension device, comprising:
- a travelling block member suspended from one or more winch driven hoist cables of the crane,
- a tool clamp, configured to releasably engage on the shank of the exchangeable tool, comprising:
- a clamp housing supported by the travelling block member, and
  - a female, open-centered body defining a shank receiving passage with a central vertical axis allowing introduction of the shank of the tool into the passage from below,
  - multiple mobile tool retainers, each mobile tool retainer being mounted on the female, open-centered body and distributed around the shank receiving passage, preferably about an open top end of said shank receiving passage, so as to each provide an operative and a non-operative position of the mobile tool retainer, the mobile tool retainers being adapted to—in a non-operative position thereof—allow introduction of the shank of the tool from below into the shank receiving passage and—in an operative position thereof—engage the shank of the exchangeable tool below the shoulder of the shank that has been introduced into the passage so as to suspend the shank, and thereby the tool, from the tool clamp underneath the tool suspension device, wherein the travelling block member of the tool suspension device is adapted to support the tool clamp and absorb the load of the suspended tool and any load supported by the tool.

The second aspect also relates to a system comprising an exchangeable tool, e.g. a crane hook, and a tool suspension device for use in a crane, e.g. on a vessel, wherein the exchangeable tool has a shank provided with a shoulder, wherein the tool suspension device comprises a travelling block member suspended from one or more winch driven hoist cables of the crane, and a tool clamp, wherein the tool clamp is configured to releasably engage on the shank of the exchangeable tool and comprises:
- a clamp housing supported by the travelling block member,
- a female, open-centered body defining a shank receiving passage with a central vertical axis allowing introduction of the shank of the tool into the passage from below,
- multiple mobile tool retainers, each mobile tool retainer being mounted on the female, open-centered body and distributed around the shank receiving passage, preferably about an open top end of said shank receiving passage, so as to each provide an operative and a non-operative position of the mobile tool retainer, the mobile tool retainers being adapted to—in a non-operative position thereof—allow introduction of the shank of the tool from below into the shank receiving passage and—in an operative position thereof—engage the shank of the tool below the shoulder of the shank that has been introduced into the passage so as to suspend the tool from the tool clamp underneath the tool suspension device.
- wherein the travelling block member of the tool suspension device is adapted to support the tool clamp and absorb the load of the suspended tool and any load supported by the tool.

The second aspect also relates to a tool suspension device for use in a crane, e.g. on a vessel, comprising:
- a travelling block member suspended from one or more winch driven hoist cables of the crane,
- an upper tool connector embodied as a tool clamp, configured to releasably engage on a shank of an exchangeable tool, comprising:
  - an upper connector body embodied as a clamp housing, supported by the travelling block member,
  - a female, open-centered body defining a shank receiving passage with a central vertical axis allowing introduction of the shank of the tool into the passage from below,
  - multiple mobile tool retainers, each mobile tool retainer being mounted on the female, open-centered body, the mobile tool retainers being distributed around the shank receiving passage, preferably about an open top end of said shank receiving passage, so as to each provide an operative and a non-operative position of the mobile tool retainer, the tool retainers being adapted to—in a non-operative position thereof—allow introduction of the shank of the tool from below into the shank receiving passage and—in an operative position thereof—engage the shank below the shoulder of the shank that has been introduced into the passage so as to suspend the tool from the tool clamp underneath the tool suspension device, wherein the travelling block member of the tool suspension device is adapted to support the tool clamp and absorb the load of the suspended tool and any load supported by the tool.

The second aspect also relates to a use of this tool suspension device in a crane, wherein the crane preferably comprises:
- a revolving structure,
- a boom, pivotally mounted to the revolving structure,
- a luffing assembly configured for luffing of the boom, a hoist assembly, comprising:
one or more hoist winches,
one or more hoist cables driven by the one or more hoist winches,
and wherein the travelling block member of the tool suspension device is suspended from the one or more winch driven hoist cables of the hoist assembly.

The invention also relates to a method of hoisting wherein use is made of a system according to the second aspect of the invention. When using a system comprising multiple exchangeable tools comprising, at upper sides thereof, identical shanks with a shoulder, the method may comprise that one of the tools is disconnected from the tool suspension device and another one of the tools is connected to the same suspension device.

For example, the shank is of steel and has a smallest diameter of at least 30 centimetres, e.g. a solid cross-section with a smallest diameter of 30 centimetres.

Preferably, the shank has at the top thereof a head and circumferential groove below said head, the shoulder forming a circumferential face delimiting the groove.

Preferably, the head is conical, tapering towards a tip of the head.

In an embodiment the shoulder is conical, tapering outwards towards the head, e.g. to a maximum diameter of the head. Preferably, a lower circumferential face delimiting the groove tapers outwards towards an elongated main shank body below the groove.

Preferably, the shank has an elongated main shank body below said groove.

Preferably, the main shank body has a uniform cross-section over its length or height.

Preferably, the shank is substantially solid in cross-section, e.g. is completely solid over its cross-section, or is provided with a small bore along at least a part of the height of the shank, e.g. for wiring, communication lines and/or pipework for fluid flow.

Preferably, the shank is made of steel, e.g. of forged steel.

The tool suspension device comprises the travelling block member that is suspended from the one or more winch driven hoist cables of the hoist assembly, and a tool clamp.

The crane can be embodied for use onboard a vessel, e.g. for transferring objects on, from and to a vessel.

Examples of tools contemplated are lifting hooks, e.g. ramshorn hooks, four-pronged hooks, etc., or e.g. offshore installation equipment, e.g. piling equipment and/or foundation parts, for example a pile upending tool, a transition piece lifting tool, a subsea noise mitigation screen, etc.

The second aspect of the invention also relates to a tool as described herein. In particular, it relates to a tool for use in a system according to the second aspect, wherein the exchangeable tool comprises at an upper side thereof a shank provided with a shoulder, configured to be engaged by the mobile tool retainers of the tool clamp upon introduction into the passage of the tool clamp, so as to be suspended from the tool clamp underneath the tool suspension device. The tool may be a crane hook, e.g. a Ramshorn hook, or a four-pronged hook.

The second aspect also relates to a tool which is embodied as a male-to-male adapter with a shank having a shoulder at a first end of the shank, and with a male tool connector at the opposite end of the shank, e.g. for use in a system that further comprises one or more tools that each comprise at an upper side thereof a female tool counter connector that is configured to be mated with the male connector.

In use, the invention enable a method to suspend the tool from the crane. The systems according to the invention enable a method of hoisting the suspended tool.

In an embodiment of a method according to the invention, wherein a system according to the second aspect of the invention is used, the mobile tool retainers are firstly brought into a non-operative position thereof. The shank is introduced from below into the shank receiving passage of the tool clamp, e.g. (as preferred) by lowering the tool clamp over the upright shank using the hoisting assembly, until the shoulder of the shank is just above the mobile tool retainers. Thereafter the mobile tool retainers are brought into the operative position thereof, e.g. actively or passively, such as to engage the shank underneath the shoulder, so that the shank is supported by its shoulder onto top surfaces of radially inward ends of the mobile tool retainers.

To remove the tool an embodiment envisages that the tool is lowered onto some support, e.g. onto a deck of a vessel, so that tool clamp is relieved of the weight of the tool. Then the mobile tool retainers are brought into their non-operative position, so that the shank may be lowered out of the shank receiving passage, e.g. by lifting the tool suspension device by means of the hoisting assembly.

In embodiments according to the invention, the travelling block member of the tool suspension device comprises one or more cable sheaves, so that the tool suspension device is suspended by the one or more winch driven cables in a multiple fall arrangement. The travelling block member therein for example forms part of a splittable block arrangement, comprising multiple cable sheaves on said travelling block member through which the one or more hoisting cables are run. The multiple cable sheaves then comprise a plurality of detachable or loose cable sheaves, and a plurality of fixed sheaves secured to the travelling block member, wherein selective detaching of one or more of the loose sheaves allows to vary the number of cable falls in the hoist assembly.

The tool retainers of the upper tool connector, e.g. tool clamp, are, in embodiments of the system, operable by one or more actuators, e.g. hydraulic actuators or electrical actuators, e.g. linear cylinders or linear spindle drives. The actuators may be configured to move the tool retainers between operative and non-operative positions, in which the lower tool connector of the tool is engaged by and disengaged from the tool retainers, respectively, such that the tool is suspended and released from the crane, respectively. In the tool clamp, the one or more actuators may be configured to move the mobile tool retainers between said operative and the non-operative position in which these allow introduction of the shank and engage the shoulder thereof, respectively.

In an embodiment, the tool retainers are configured to move passively from the non-operative to the operative position, so that the upper tool connector, e.g. tool clamp, is self-locking. One or more actuators may then be provided to move the tool retainers from the operative to the non-operative position only.

The travelling block member of the tool suspension device is adapted to support the tool clamp and absorb the load of the suspended tool.

In embodiments, the upper tool connector further comprises:
a bearing, operative between the upper connector body and the tool retainers, so as to allow for swivelling of the tool retainers, and thereby the tool if engaged thereby, about a vertical axis of the upper connector body relative to the upper connector body; and, preferably also a rotational drive operative between the upper connector body and the tool retainers and configured to selectively drive said swivelling of the tool retainers, and thereby of the tool, relative to the upper connector body about the vertical axis.

In embodiments wherein the upper tool connector accords to the first aspect of the invention, the bearing may be mounted between the clamp housing and the female, open-centered body. The bearing then supports the female, open-centered body so as to allow for said swivelling of the female, open-centered body about the vertical axis relative to the clamp housing. The rotational drive is therein operative between the clamp housing and the female, open-centered body and configured to selectively drive said swivelling of the female, open-centered body and of the mobile tool retainers mounted thereon, and thereby of the tool, relative to the clamp housing about the central vertical axis of the tool clamp.

The rotational drive may comprise an operable clutch allowing to switch between a coupled condition and a freewheeling condition. For example a driving torque of a driving shaft of the rotational drive generated by the rotational drive is transmitted to the tool retainers. Where the upper tool connector is embodied as the tool clamp, this torque is for example transmitted to the female open-centered body on which the tool retainers are mounted, via the clutch. The clutch being may be externally switchable to couple and decouple the driving shaft to and from the tool retainers, e.g. the female open-centered body, respectively, such that the swivelling of the tool retainers, e.g. the body, is driven by, and freewheels from, the rotational drive, respectively.

The rotational drive may comprise a differential with an operable brake, which in an inactive condition allows for, and in an active condition blocks the rotational drive to transmit a driving torque of a driving shaft of the rotational drive generated by the rotational drive to the tool retainers, e.g. the body, via the differential, respectively, such that in said inactive condition and active condition the rotation of the tool retainers, e.g. the body, is driven by, and freewheels from, the rotational drive, respectively.

Hence, by means of the rotational drive, the rotation of the retainers, and the tool they retain, is driven along with the rotation of the female, open-centered body with respect to the travelling block member. By means of the so achieved controlled swivelling of the tool, said tool and, if present, a load suspended therefrom is positionable into a desired angular.

In an embodiment, the female, open-centered body is fixed to, or forms at a circumference, a cogwheel which is engaged by one or more gears transmitting the driving torque of the driving shaft of the rotational drive for driving the rotation of the body. This cogwheel may e.g. be an outwardly cogged cogwheel enclosing or being formed by the outer circumference of the body.

In an embodiment of the system, at least one tool is embodied as a male-to-male adapter wherein the shank is provided with the shoulder at a first end of the shank that is to be inserted in the tool clamp, and wherein a male tool connector is provided at the opposite end of the shank. The system then further comprises one or more further tools that each have a female tool counterconnector that is configured to mate with the male tool connector of the male-to-male adapter tool. For example, the male tool connector has a head, e.g. a conically pointed head, and a circumferential array of outwardly pivoting latch members that are embodied to engage underneath a flange of a bore of the female counterconnector into which the head is received.

When the shank of the male-to-male adapter is connected to the further tool via the interconnection of the male connector and the female tool counterconnector, and is inserted with its shank into the tool clamp the tool is as a result suspended via the adapter from the clamp and thereby from the tool suspension device.

Providing this male-to-male adapter extends the range of tools that can be suspended from the tool suspension device, as it e.g. also enables to suspend tools, e.g. existing tools, that are provided with female tool counterconnectors, and not only tools comprising the shank.

For example, the male tool connector of the male-to-male adapter and the female counterconnector of the tool are embodied as shown in WO2018/139931, so that using the adapter, for instance the pile upending tool and transition piece lifting tool shown therein can be suspended from the tool suspension device.

In an embodiment that accords to the second aspect of the invention, the mobile tool retainers are each embodied as a lever comprising an arm and a fulcrum of the arm relative to the female, open-centered body. Preferably, this is done such that the fulcrum provides a horizontal axis for pivoting of the arm, which fulcrum is mounted on the female, open-centered body. Herein one end of the arm, the radially inner end of the arm, is adapted to—in the operative position—engage the shoulder of the shank of the tool. In the non-operative position of the mobile tool retainer, the tool retainers are each cleared from a zone aligned with the passage to allow the passage of the shank of, or connected or connectable to, the tool upwardly past the in this position uppermost end of the arm upon introduction or removal of the shank into and out of the tool clamp. Preferably, the other end of the arm of the lever, the radially outer end of the arm, relative to the fulcrum, is operable by an actuator configured to move the lever between the operative and the non-operative position.

In the preferred case that the fulcrum provides a horizontal axis for pivoting of the arm, operation of the actuator moves the radially outer end generally vertically. Preferably, therein, the radially inner end is in the non-operative position of the mobile tool retainer tilted upwards, and correspondingly the radially outer end downwards. Therein, because the inner end of the lever embodying each mobile tool retainer is higher in the non-operative position than in the operative position, the shank is inserted moving upwardly until the shoulder is above said inner ends of the levers, and then follows—e.g. simultaneously or subsequently—the downward movement of the inner ends to the operative position, to be supported by the top surfaces thereof.

The fulcrum of each mobile tool retainer may be mounted to the female open-centered body in a resilient manner via a resilient element, e.g. via one or more springs or a resilient material, such that in the operative position, radial forces exerted on the mobile tool retainer by the shoulder of the shank, because of the weight of the tool suspended therefrom, result in a compression of the resilient element, in order to reduce or substantially avoid material tension in the radially more outward solid parts of the tool clamp.

In an embodiment a mobile levers control ring is provided, which is movable up and down relative to the open-centered body and is adapted to engage on the outer ends of all levers of the mobile tool retainers so that the control ring is able to move all levers in unison between the operative and non-operative position. One or more actuators, e.g. hydraulic or pneumatic jacks and/or spindle drives, e.g.

electric spindle drives, may be provided to move the control ring up and down. When, as is preferred, the radially inner end is in the non-operative position of the mobile tool retainer tilted upwards, and correspondingly the radially outer end downwards, the control ring preferably extends above the outer ends of the levers and, e.g. upon actuation by the one or more actuators, engages top surfaces thereof and by moving downwards moves these downwards as well from the operative into the non-operative position. To move the outer ends upwards, thereby moving the mobile tool retainers from the non-operative into the operative position, the control ring moves upwards to at least the height of the top surfaces in the operative position, or a bit higher. It is envisaged that some additional movability is provided, to facilitate the shank being inserted to somewhat higher than the inner ends in the non-operative position, prior to moving downwards again to be engaged and supported thereby.

In an embodiment, each of the mobile tool retainers comprises at the radially outer end thereof a lower control ring engagement surface, which extends underneath the control ring, and an upper control ring engagement surface, which radially adjoins the inner circumference of the control ring in the operative position of the mobile tool retainer. The lower control ring engagement surface is such that the control ring, when moving downwards to move the mobile tool retainers from the operative to the non-operative position, engages the lower control ring engagement surfaces such as to push the radially outer ends of the mobile tool retainers downwards, pivoting them to the non-operative position. The upper control ring engagement surface is such that the control ring, when the mobile tool retainers are in the operative position thereof, radially engages the upper control ring engagement surface upon any pivoting movement thereof. The control ring thereby establishes a form-lock of the mobile tool retainers, securing the mobile tool retainers in the operative position.

Embodiments of the invention are also envisaged in which the mobile tool retainers move substantially radially between the non-operative and operative position, so that no downward movement is needed after insertion of the shank in order to reach engagement of the shank by the tool clamp. In an example, two C-shaped plates are provided as mobile tool retainers. They are provided at diametrically opposite sides of the shank receiving passage with the open ends directed toward each other, their planes extending in the radial direction, such as to define an opening. This opening in the non-operative position is such that it allows introduction of the shank of the tool from below into the shank receiving passage. To move from the non-operative position to the operative position, the plates move with the open ends towards each other such as to reduce the size of the opening such as to engage below the shoulder of the shank that has been introduced into the passage to suspend the tool from the tool clamp.

In an embodiment, a line of force runs, for each mobile tool retainer, inclined downwards and radially outwards from the interface between the shoulder of the shank and the mobile tool retainer, when the shank, and thereby the tool, is suspended from the tool clamp. Preferably, along said line of force, in the operative position of the mobile tool retainer, the retainer is supported directly on a portion of the open-centered body. This allows for direct load transfer due to contact between the retainer and a portion of the open-centered body on said line of force. The retainer is then sandwiched between the shank on the one hand and the open-centered body on the other hand along said line of force. This avoids undue bending loads on the retainer. The force exerted onto the mobile tool retainers is the led via the female open-centered body of the tool clamp towards the clamp housing, and via the clamp housing to the remainder of the tool suspension device. Preferably, when present, the bearing between the clamp housing and the female, open-centered body is within the lines of force.

In embodiments a shoulder engagement surface of each mobile tool retainer at the radially inner end thereof, which engages the shoulder of the shank in the operative position of the mobile tool retainers, extends inclined downwards in the radially inward direction. In an embodiment, the shoulder engagement surfaces are straight without bends or curves. In another embodiment, the shoulder engagement surfaces are spherical or concave, so that the mobile tool retainers together define the shape of an annular portion of a sphere, like a ball joint, when in the operative position. The shoulder engagement surfaces of the shank may in embodiments e.g. also be convex, or be curved or bent in another way, e.g. in a slight S- or Z-shape.

Preferably, engagement surfaces of the shoulder that are engaged by said surfaces of the mobile tool retainers are shaped complementary to the shoulder engagement surfaces of the mobile tool retainers. For example, in an embodiment wherein the shoulder engagement surfaces of the mobile tool retainers are spherical or convex, the engagement surfaces of the shoulder are spherical or concave with substantially the same curvature, such as to match and adjoin the shoulder engagement surfaces in the operative position of the mobile tool retainers. This allows to have the interaction similar to a ball joint, albeit with restricted mobility as the shank passes through a corresponding shank receiving passage. Yet, the limited ball joint functionality allows to avoid undue local stresses in the structure.

In an embodiment the mobile tool retainers each have a clamping jaw configured to engage on the shoulder of the shank of the tool, which is preferably an exchangeable clamping jaw, e.g. removably mounted on the arm of the lever, allowing to match the dimensions and/or shape of the clamping jaw to that of the corresponding part of the shank of the tool it engages.

An exchangeable clamping jaw may allow for replacement in case of wear, and may also allow to match the exact dimensions and/or shape of the jaw to that of the shank of the tool.

The exchangeable clamping jaw may also be machined more easily than the entire lever on which the jaw is fitted, or made of another material, e.g. a friction material.

In an embodiment, six or more mobile tool retainers are provided on the tool clamp.

In an embodiment, the open-centered female body is embodied as a vertically arranged cylinder with a flanged top end supporting the mobile retainers thereon. For example, a thrust bearing supports the flanged top end of the body on the housing.

In an embodiment, the upper tool connector, e.g. the tool clamp, is configured to engage the lower tool connector, e.g. the shank, of the tool in a rotational direction of the tool retainers, e.g. the body, by means of friction at interfacing surfaces, e.g. said friction emanating from the weight of the tool.

In an embodiment, the upper tool connector, e.g. the tool clamp, is configured to engage the lower tool connector, e.g. the shank, of the tool in a rotational direction of the tool retainers, e.g. the body, by means of a rotationally asymmetric wall of the passage matching a mating rotationally asymmetric outer surface of the lower tool connector, e.g. the shank, of the tool.

In an embodiment, the upper tool connector, e.g. the tool clamp, is configured to engage the lower tool connector, e.g. the shank, of the tool in a rotational direction of the tool retainers, e.g. the body, by means of latching of the tool retainers against matching radial protrusions at the lower tool connector of the tool, e.g. at the one or more shoulders of the shank of the tool.

In an embodiment, the travelling block member is adapted to support the upper tool connector, e.g. the tool clamp, pivotally around a horizontal axis. Hence, some swinging of the upper tool connector, e.g. the tool clamp, with respect to the block member is achieved about this axis.

In an embodiment wherein the upper tool connector is embodied as the tool clamp, the passage of the open-centered body thereof evolves into or adjoins at a lower end thereof a downwardly diverging funnel. This funnel facilitates the positioning of the tool with respect to the passage while moving it from below into the passage.

In an embodiment wherein the upper tool connector is embodied as the tool clamp, the load exerted via and/or by the shoulder of the shank of the tool on the mobile tool retainers due to the weight of the tool and any load carried thereby during use is, at least partially, equalized, when the force exerted thereon by the shoulder is not uniform along the mobile tool retainers. This may occur when the shank has, e.g. unintendedly, been inserted under a slight angle with respect to the central vertical axis of the tool clamp. To establish such equalization of the load on the mobile tool retainers, the mobile tool retainers may firstly be pre-stressed in a radial direction. Secondly, a restraint for the shank may be provided at a lower position on the tool clamp, e.g. at a bottom side of said clamp housing or at the bottom of said shank receiving passage of the female open-centered body, which decreases a moment of the shank perpendicular to the central vertical axis of the clamp. A third option is to mount the mobile tool retainers, separately or grouped, onto a gimbal-like configuration, e.g. onto compressible and expandable elements, e.g. made out of rubber, to compensate small variations in positions or orientations between the mobile tool retainers resulting from unequal loading.

In an embodiment a control unit is provided by which an operator above sea level, e.g. a crane operator on the vessel, can operate moving parts of the upper tool connector, e.g. the tool clamp, and/or of the tool, if present, for example when these are underwater during an operation, and/or to operate and manipulate an ROV that manipulates different parts underwater. Preferably, at least the tool retainers and, if present, the rotational drive of the upper tool connector, e.g. tool clamp, are controllable via the control unit, e.g. by operating the actuators of the control ring, if present. If present, the clutch and/or brake of the tool clamp is preferably also controllable via the control unit.

In an embodiment electrical energy to be used by electrical devices below the upper tool connector, e.g. the tool clamp, e.g. by the tool suspended therefrom or an object underneath it, e.g. sensors and/or imaging devices to be described herein, and/or electrical signals, and/or data, e.g. sensor data and/or camera data, if employed by the tool clamp and/or the tool, are transferred between those devices and an electric power supply above sea level by means of a slip ring with contacts. The slip ring may therein be provided in the upper tool connector or the lower tool connector, wherein electrical energy from an energy source, e.g. provided on the crane, or elsewhere on the vessel, is supplied to the upper tool connector, and via the slip ring with contacts to the lower tool connector and further on to the parts to be operated thereby.

In an embodiment electrical power to be used by electrical devices below the upper tool connector, e.g. the tool clamp, e.g. by the tool suspended therefrom or an object underneath it, e.g. sensors and/or imaging devices to be described herein, and/or electrical signals, and/or data, e.g. sensor data and/or camera data, if employed by the tool clamp and/or the tool, are transferred between those devices and an electric power supply above sea level by means of an inductive connector. Such an inductive connector has no galvanic contact that could be exposed to water and avoids problems of e.g. corroding pins and short circuits. The inductive connector can be embodied as a wet-mate inductive connector as already employed in subsea applications.

An inductive connector employed in the system according to the invention may comprise a transformer of which a primary or secondary side sits in a female part of the inductive connector and a secondary or primary side sits in a male part, e.g. complementary male part, of the inductive connector, respectively. Both parts are provided with an electrical circuit, which forms either the primary or secondary side of the transformer. One of these parts has its circuit connected via wiring to an electrical power supply and/or a data communication system, e.g. arranged in the crane or elsewhere on the vessel, and the other part is provided in or on the lower tool connector, e.g. the shank, of the tool, having its circuit connected to wiring that runs downwards, e.g. to a point further below the object suspension device, e.g. where it can be connected to an electrical device and/or to data communication component.

In an embodiment the upper tool connector comprises one of the female part or the male part, the circuit thereof being connectable via wiring to an electrical power supply, e.g. on said crane or externally therefrom, e.g. if present, on the vessel. The lower tool connector comprises the other one of the male part and the female part, having its circuit run downwards to electrical energy consuming parts of the suspended tool. The male and female part are positioned relative to one another such as to enable electrical interconnection of the male and female part while the tool is being suspended from the upper tool connector, and thereby supply of electrical energy from the electrical power supply to the energy consuming parts of the tool.

Communication signals may be transmitted in the same way as electric signals. The male part and the female part of the inductive connector may furthermore also each be provided with an antenna for data communication.

The electrical components of both the male and female part of the inductive connector are preferably protected, e.g. by a covering layer of insulating material, from water and pressure.

The inductive connector may e.g. be embodied to transfer up to 2 kW of electrical power, and, in embodiments, communication in the range of 80 megabit of Ethernet.

The electrical power supply via the inductive connection may also be used to power to the rotational drive and/or to move the clutch and/or brake, if present, of the upper tool connector, e.g. the tool clamp. Herein said electrical power may be derived from one or more batteries and/or another electrical power source, e.g. a generator, associated with an exchangeable tool of the system.

In an embodiment one or more of the exchangeable tools is provided with an electrical power source, e.g. one or more batteries and/or a generator, and the system comprises an inductive connector between the shank of the tool and the tool suspension device, for example electrical power from said tool based source being used to supply power to one or more of a rotational drive, actuators for the mobile retainers, clutch, brake, of the upper tool connector, e.g. the tool clamp.

In an embodiment the travelling block is provided with an electrical energy source, e.g. one or more electrical batteries and/or a generator, and the system comprises an inductive connector between the shank of the tool and the tool suspension device, e.g. allowing to connect the energy source source to electrical components of the tool and/or a load or object handled by the tool, and/or to energy consuming parts of the upper tool connector, e.g. actuators or sensors, and/or to equipment on the tool suspension device, e.g. sensors or a data/signal transfer unit.

Preferably, the part of the inductive connector—male or female—that is provided to the shank is positioned aligned with, so at, or rotationally symmetric around the central axis thereof, so that the position of the other part of the inductive connector is also centrally in the tool suspension device. For example, the configuration allows for the male and female inductive connector parts to rotate relative to one another in the embodiment wherein the female open-centered body is mounted rotationally as described herein.

In an embodiment, the male part of the inductive connector is provided inside the upper tool connector, e.g. the shank, e.g. centrally recessed vertically within the head end of the shank, e.g. above the shoulder of the shank. Preferably, where the upper tool connector is embodied as the tool clamp and the lower tool connector as the shank, the male part of the inductive connector is located in a top section of the shank that extends above the tool clamp when the shank is engaged by the tool clamp, such that the female part may be inserted from above into the recess to establish connection with the male part.

In an embodiment wherein the upper tool connector is embodied as the tool clamp and the lower tool connector as the shank, the male part of the inductive connector is provided at an outer side surface of the shank, e.g. above the shoulder of the shank, for example an outer side surface of a head end of the shank that extends above the tool clamp when engaged by the tool clamp, such that the female part may be brought in contact with the male part from above or sideways, e.g. placed from above over the top end of the shank which extends above the shoulder, the connector e.g. being annularly shaped around the circumference of the shank, e.g. positioned in a radial recess of the outer surface such as to be flush with the outer surface of the shank. In this embodiment, preferably, the male part is protected against possible striking against the wall defining the passage of the tool clamp, or other parts of the tool clamp, while inserting the shank into the passage. This may e.g. be established by a layer of material, possibly releasable after the insertion for consequently establishing the inductive connection with the female part.

In an embodiment wherein the upper tool connector is embodied as the tool clamp and the lower tool connector as the shank, the female part of the inductive connector, is provided at the shank, e.g. above the shoulder of the shank, in particular at or in a top section or head end of the shank that extends above the tool clamp when engaged by the tool clamp, such that the male part of the connector may be brought into contact and connected with the male part from above.

In an embodiment wherein the upper tool connector is embodied as the tool clamp and the lower tool connector as the shank, the male or female part of the inductive connector is provided at or in a bottom section of the shank of the tool, e.g. in a bottom section of the shank that extends below the tool clamp when the shank is engaged by the tool clamp, such that the male or female part of the inductive connector may be connected with respectively the female or male part from below or sideways.

The wiring connected to the electrical circuit of a part of the inductive connector may run centrally within the shank, e.g. through a central bore within the shank, from the bottom of the male or female part, whichever is provided at or in the shank with the shoulder, downwards within the shank to a point which, when the tool is suspended from the clamp, is located below the tool clamp, e.g. a point in or on the shank, and run further outwards, e.g. radially, towards an electric power connection point at the interface, e.g. for a plug and socket connection to further equipment and/or to a power source of the tool. Another option is that the wiring runs further downwards through the shank for a direct connection with wiring inside the tool, or, when the shank is integral with the tool, run downwards from the shank to within the tool, and/or downwards for a direct connection with e.g. sensors, imaging devices or other electric devices to be used in or on the shank itself, the adapter, the tool, or the object to be suspended. When the shank is comprised by the male-to-male adapter, an electric connection with wiring and/or devices in or on the tool may also e.g. be at the male connector on the lower end of the adapter, the wiring running from the male part of the inductive connector all the way down to the lower end of the adapter.

In an embodiment, the female part of the inductive connector comprises an inner housing formed with a spherical cavity bounded by a surface layer, and the complementary male part comprises a spherical portion and is bounded by a surface layer. The electrical circuit of the female part is formed with a spherical concave side facing the surface layer of the female part, and that of the male part is positioned in the spherical portion, and is formed with a spherical convex side facing the surface layer of the male part.

Preferably, the part of the inductive connector—male or female—that is provided to the shank is positioned at or rotationally symmetric around the central axis thereof, so that the position of the other part connected to the power supply above sea level and that of the attached wiring is least affected by the rotation of the lower tool connector, e.g. the shank, and thereby the tool, while being connected.

A particular wet-mate inductive connector for subsea use is known from EP2932517 B1. In an embodiment, the inductive connector is embodied as disclosed therein.

In an embodiment, the lower tool connector comprises a fitting for a stab connector for transfer of hydraulic and/or pneumatic fluid, which fitting is adapted to connect to a stab counterconnector of the upper tool connector, e.g. on the crane or externally therefrom, e.g. if present, on the vessel. This fitting and counterconnector are positioned relative to one another such as to enable hydraulic or pneumatic interconnection thereof while the tool is being suspended from the upper tool connector, and thereby transfer of the hydraulic or pneumatic fluid from a hydraulic or pneumatic power unit supply to hydraulically or pneumatically operating parts of the tool. The fitting is adapted to connect to the stab connector for transmitting of hydraulic or pneumatic fluid from a hydraulic or pneumatic power unit, e.g. to energize equipment on the tool or of equipment to be handled by the tool, e.g. to be used while the tool is lowered underwater.

In an embodiment wherein the upper tool connector is embodied as the tool clamp, and the lower tool connector as the shank, the shank of a tool of the system comprises a stab connector fitting adapted to mate with a stab connector for the transfer of hydraulic and/or pneumatic fluid.

For example, a stab connector fitting and mating stab connector as disclosed in WO2013114065 is provided.

The stab connector fitting may e.g. be provided centrally within a top section or head end of the shank which extends above the tool clamp when the shank is engaged by the tool clamp, e.g. recessed therein. The shank may then be provided with a central bore which ends in a section extending below the tool clamp, when the shank is engaged thereby, in a connection point for the subsea equipment.

Preferably, the stab connector fitting is positioned at the central axis of the shank.

In an embodiment the tool suspension device, e.g. the travelling block thereof, is provided with an source of pressurized fluid, e.g. one or more storage tanks for storage of pressurized pneumatic fluid and/or pressurized hydraulic fluid and/or a compressor or pump, and the system comprises a stab connector system for transfer of hydraulic and/or pneumatic fluid between the tool and the tool suspension device, e.g. allowing to connect one or more storage tanks for storage of pressurized pneumatic fluid and/or pressurized hydraulic fluid to an hydraulic and/or pneumatic component on the tool and/or a load or object handled by the tool.

In an embodiment, the lower tool connector, e.g. the shank, comprises one of the female part and male part of an inductive connector, and furthermore a fitting for the stab connector. In an embodiment wherein the upper tool connector is the tool clamp and the lower tool connector the shank, the male part of the inductive connector is provided at an outer side surface of the shank with the shoulder, e.g. above the shoulder of the shank, in particular an outer side surface of a top section of the shank that extends above the tool clamp when engaged by the tool clamp, e.g. with the additional options as described above, and the stab connector fitting is provided centrally within the top section of the shank, e.g. with a central bore running to below the tool clamp, e.g. with the additional options as described above.

In an embodiment, one or more sensors are implemented in the system, e.g. to provide feedback on the crane related activities, e.g. subsea activities, e.g. to check the correctness of, and eventually on the basis thereon adjust, the functioning of the upper tool connector, e.g. the tool clamp, to verify the positions and movement of different parts, and relative to each other, or e.g. to check if the necessary electrical currents, electrical signals and/or fluid flows are running.

Based on the feedback provided by the one or more sensors, the system may be monitored, and corrections and/or adjustments may be made by an operator, and/or for example to control a subsea ROV involved in manipulating subsea parts held by the crane. The system may be provided with a data connection for transferring the sensor output data to a digital monitoring system. The output may e.g. be shown on a screen, e.g. on the vessel, to be interpreted by an operator, and corresponding adjustment of the operation or manipulation of the tool, the load suspended therefrom, if present, the tool clamp, the parts of inductive connectors and/or establishing the stab connection, or other parts involved.

The adjustment or manipulation may be controlled directly by an operator. The output may also be sent directly to a control unit of an ROV, adapted to interpret the signals and adjust or correct the operation and/or manipulation of the tool, any load suspended from the tool, and/or the upper tool connector, e.g. the tool clamp, automatically.

Using the feedback in a control unit for the operation of the upper tool connector, e.g. the tool clamp, e.g. operating actuators of the mobile tool retainers thereof, e.g. the actuators of the control ring, if present, and/or e.g. the rotational drive of the upper tool connector, e.g. the tool clamp, the clutch and/or the brake thereof, if present, is also envisaged.

By utilizing the feedback from one or more sensors, a digitalization and/or automation of the operation of the system may be achieved and/or may be made more precise.

The one or more sensors may for instance include one or more imaging devices, e.g. one or more camera's, one or more sensors configured for determining and/or recording locations and/or positions and/or displacements, one or more sensors measuring mechanical parameters such as strain and/or tension and/or force, one or more sensors measuring relative displacements, one or more GPS sensors, inclination sensors, and so on.

In embodiments, the functioning of the upper tool connector, e.g. the tool clamp may be monitored. It may, for example, be verified by the output of one or more GPS-sensors and/or inclination sensors, e.g. on the tool retainers, an imaging device such as one or more cameras and video processing units above sea level or implemented in an ROV providing feedback on relative positions, movements and/or orientations if the tool retainers are in the right positions, or move to the right positions, while engaging and disengaging the lower tool connector, e.g. the shoulder of the shank, e.g. if the shoulder is correctly engaged and supported by the mobile tool retainers, and the relative position, orientation and movement of the shank relative to the shank receiving passage and/or the mobile tool retainers during insertion, engagement by the tool retainers, disengagement, and removal of the shank into and from the shank receiving passage.

In an embodiment, one or more sensors are implemented for recording one or more mechanical parameters such as strain, tension and/or force, e.g. for parts of the tool clamp and/or the shank of the tool.

The tool suspension device may be provided with a data connection to a digital monitoring system for monitoring a correct operation of the upper tool connector, e.g. of the tool clamp, that is, at least, to enable a passage of the shank of the tool through the passage in the non-operative position and an engagement of the shank extending through the passage in the operative position, so as to suspend the tool from the tool clamp.

One or more sensors may also be implemented to, e.g., measure underwater the absolute position and/or orientation, e.g. including the verticality, of the upper tool connector, e.g. the shank, the tool, and/or the load attached to the tool, e.g. by an inclination sensor. The output may be shown on a screen or sent for interpretation and corresponding adjustment of the operation or manipulation of the tool, the load suspended therefrom, if present, or the tool clamp, e.g. directly or via an ROV, by an operator. The output may also be sent directly to an ROV adapted to interpret the signals and adjust or correct the operation of the tool, load, tool clamp by itself.

One or more sensors monitoring electric current may be employed to verify if the inductive connection, when present, is working properly, if present, if the currents and voltages supplied are correct, and/or if there is a defect in the electrical circuit. Similarly, one or more sensors measuring fluid flow and/or fluid pressure may be used to verify if the stab connection, if present, is working properly, check the pressure and flow rate, and/or detect leakages, obstructions or other defects within the flow line.

The invention also relates to a system comprising a tool suspension device and a tool as described herein and to the use of such a system.

Furthermore, the invention also relates to the use of this system in a crane, wherein the crane comprises a revolving structure, a boom, pivotally mounted to the revolving structure, a luffing assembly configured for luffing of the boom, and a hoist assembly. The hoist assembly therein comprises one or more hoist winches and one or more hoist cables driven by the one or more hoist winches. Therein the travelling block member of the tool suspension device is suspended from the one or more winch driven hoist cables of the hoist assembly.

The invention also relates to a system comprising a crane and an exchangeable tool.

The invention also relates to a system comprising a tool and a tool suspension device for use in a crane.

The invention also relates to an exchangeable tool having a shank provided with a shoulder as described herein, configured to be connected to a tool suspension device as described herein. The invention also relates to the use of such an exchangeable tool.

In a third aspect thereof, the invention proposes a tool clamp, which is configured to releasably engage on a shank of an exchangeable tool at an upper side of the tool. It comprises:
- a clamp housing, supported by the travelling block member,
- a female, open-centered body defining a shank receiving passage with a central vertical axis allowing introduction of the shank of the tool into the passage from below,
- multiple mobile tool retainers, each mobile tool retainer being mounted on the female, open-centered body, the mobile tool retainers being distributed around the shank receiving passage, preferably about an open top end of said shank receiving passage, so as to each provide an operative and a non-operative position of the mobile tool retainer, the tool retainers being adapted to—in a non-operative position thereof—allow introduction of the shank of the tool from below into the shank receiving passage and—in an operative position thereof—engage the shank below the shoulder of the shank that has been introduced into the passage so as to suspend the tool from the tool clamp underneath the tool suspension device, and
- a bearing operative between the clamp housing and the mobile tool retainers, so as to allow for swivelling of the mobile tool retainers, and thereby the tool if engaged by the mobile tool retainers, about a vertical axis of the clamp housing relative to the clamp housing.

The bearing may in particular be mounted between the clamp housing and the female, open-centered body, said bearing supporting the female, open-centered body so as to allow for said swivelling of the female, open-centered body about the vertical axis relative to the clamp housing.

In embodiments the tool clamp further comprises a rotational drive operative between the clamp housing and the mobile tool retainers and configured to selectively drive said swivelling of the mobile tool retainers, and thereby of the tool, relative to the clamp housing about the vertical axis. The rotational drive may be operative between the clamp housing and the female, open-centered body and configured to selectively drive said swivelling of the female, open-centered body and of the mobile tool retainers mounted thereon, and thereby of the tool, relative to the clamp housing about the central vertical axis of the tool clamp.

In embodiments the rotational drive comprises an operable clutch allowing to switch between a coupled condition and a freewheeling condition. For instance a driving torque of a driving shaft of the rotational drive generated by the rotational drive is transmitted to the female open-centered body on which the mobile tool retainers are mounted, via the clutch, the clutch being externally switchable to couple and decouple the driving shaft to and from the female open-centered body respectively, such that the swivelling of the female open-centered body, and thereby of the mobile tool retainers, is driven by, and freewheels from, the rotational drive, respectively.

In embodiments the rotational drive comprises a differential with an operable brake, which in an inactive condition allows for, and in an active condition blocks the rotational drive to transmit a driving torque of a driving shaft of the rotational drive generated by the rotational drive to the female open-centered body via the differential, respectively, such that in said inactive condition and active condition the rotation of the female open-centered body is driven by, and freewheels from the rotational drive, respectively.

In embodiments the mobile tool retainers are each embodied as a lever comprising an arm and a fulcrum of the arm relative to the female, open-centered body, preferably said fulcrum providing a horizontal axis for pivoting of the arm, which fulcrum is mounted on the female, open-centered body, and wherein one end of the arm is adapted to—in the operative position—engage the shoulder of the shank of the tool, and in the non-operative position is cleared from a zone aligned with the passage to allow the passage of a shank of the tool past the end of the arm upon introduction or removal of the shank into and out of the tool clamp (8), and wherein, preferably, the other end of the arm of the lever is operable by an actuator configured to move the lever between the operative and the non-operative position.

In embodiments the mobile tool retainers each have a clamping jaw configured to engage the shoulder of the shank, which is preferably an exchangeable clamping jaw, e.g. removably mounted on the arm of the lever, if present, allowing to match the dimensions and/or shape of the clamping jaw to that of the corresponding part of the shank of the tool.

In embodiments the female, open-centered body is embodied as a vertically arranged cylinder with a horizontally flanged top end having a flange portion on which the mobile retainers are mounted, and wherein, if present, the bearing supports the flanged top end of the body.

Embodiments of the first, second and third aspect may be combined to provide similar advantages. Preferred embodiments of the invention accord to multiple aspects, e.g. all aspects of the invention.

BRIEF DESCRIPTION OF THE DRAWINGS

The invention will now be described by reference to the appended drawings. In the drawings:

FIG. 7A is a top view of a mobile tool retainer of the invention being in the operative position, FIG. 7B is a top view of the same mobile tool retainer being in the non-operative position, FIG. 7C is a side view of a mobile tool retainer of the invention being in the operative position and engaging a shank, FIG. 7D is a side view of the same mobile tool retainer being in the non-operative position and not engaging the shank.

DETAILED DESCRIPTION OF EMBODIMENTS

These figures illustrate embodiments that accord to the first, second and third aspect of the invention. The upper tool connector is therein embodied as a tool clamp, and the lower tool connector as a shank with a shoulder.

Figure 1:
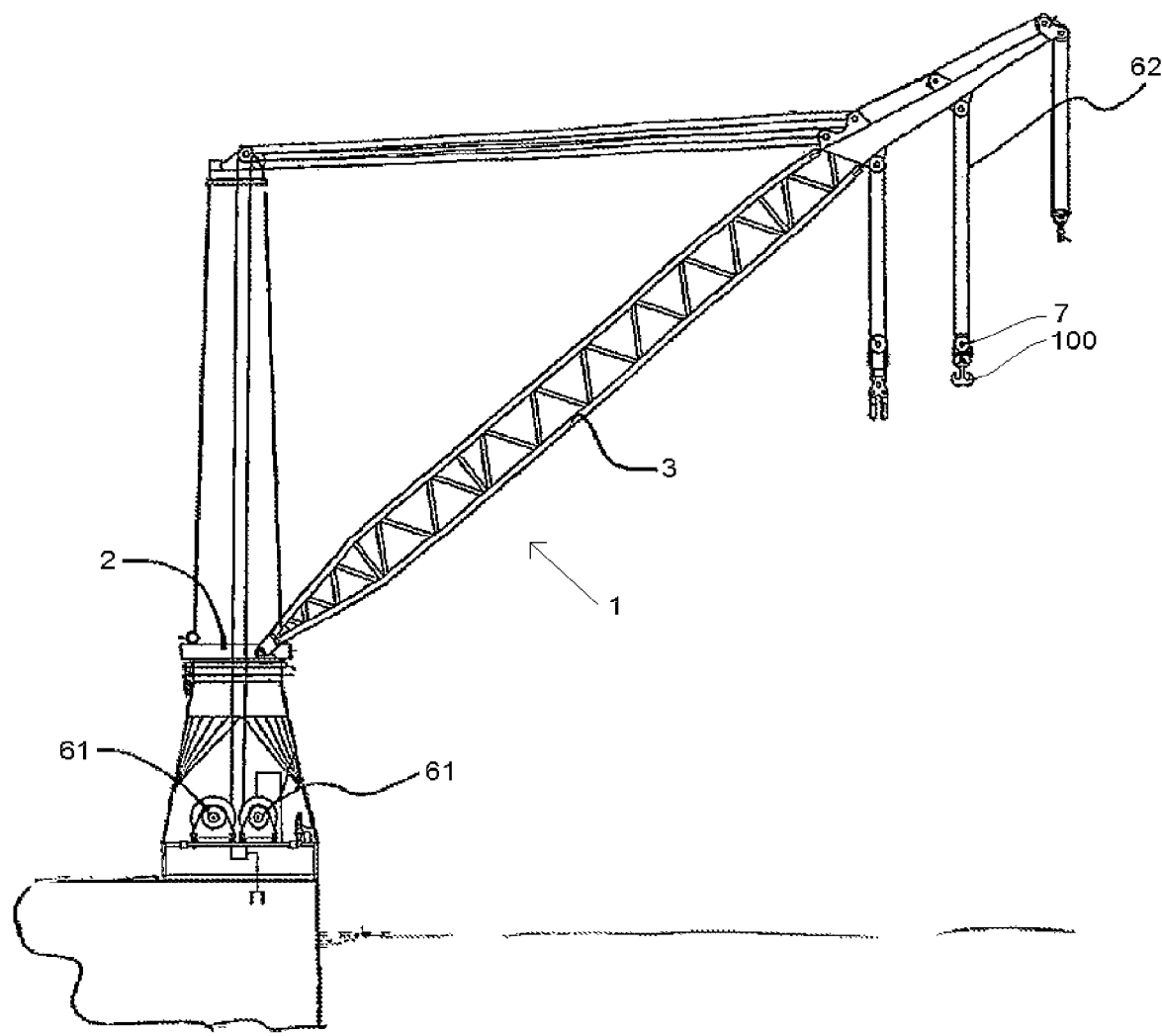
FIG. 1 shows a system according to the invention on a vessel.

FIG. 1 shows a system according to the invention, comprising a crane 1 and the shank with the shoulder that is comprised by a tool 100, being used on a vessel. It shows that crane 1 of said system comprises a revolving structure 2, a boom 3, pivotally mounted to the revolving structure 2, a luffing assembly 4 configured for luffing of the boom 3, a tool suspension device 7, configured to connect the shank 101 of the tool 100 to suspend the tool 100 underneath the tool suspension device 7, and a hoist assembly 6. The hoist assembly 6 comprises one or more hoist winches 61, one or more hoist cables 62 driven by the one or more hoist winches 61, extending from the one or more hoist winches 61 to the tool suspension device 7 such as to support the tool suspension device 7.

As shown in FIGS. 2A-E, the tool suspension device 7 comprises a travelling block member 70 suspended from the one or more winch driven hoist cables 62 of the hoist assembly 6, and a tool clamp 8.

The travelling block member 70 of the tool suspension device 7 is adapted to support the tool clamp 8 and absorb the load of the suspended tool 100. The travelling block member 70 is furthermore adapted to support the tool clamp 8 pivotally around a horizontal axis. In e.g. FIGS. 3A-E and FIG. 6B it can be recognized that the clamp housing 81 comprises at opposite sides two radially outwardly protruding cylindrical parts, which fit into complementary passages of the tool suspension device 7 at the front and back side thereof, as e.g. shown in FIGS. 2A-C, to establish the ability to pivot around a horizontal axis.

The travelling block member 70 thereto comprising a travelling block outer frame 71 defining an outer contour of the travelling block member 70. The travelling block member 70 comprises two traverse frame elements 73 in the form of two vertically parallel traverse frame plate elements 73, which—when seen in a top view of the tool suspension device 7—horizontally enclose cable sheaves 74 of the travelling block member 70, and the tool clamp 8. The traverse frame plate elements 73 comprise two recesses 72 configured to support the tool clamp housing 81, such as to retain the tool clamp 8 substantially within the outer contour of the travelling block member 70. The recesses are provided horizontally opposite one another, inwardly facing each other.

The recesses 72 are configured to pivotally support the tool clamp housing 81 such as to retain the tool clamp 8 pivotally with respect to the travelling block outer frame 71 around a substantially horizontal connector pivot axis 75 extending through the travelling block outer frame 71. The tool clamp housing 81 comprises two horizontally aligned and axle ends 91, see e.g. FIGS. 3A-E, which are supported within the associated respective recesses of the travelling block outer frame 71, within bearings provided therein. The axle ends 91 and recesses are arranged along the connector pivot axis 75 at opposed sides of the tool clamp housing 81. Thereby a pivoting of the tool clamp 8 around the connector pivot axis 75 is enabled, while the travelling block member 70 absorbs the load of the suspended tool 100 and any load supported by the tool 100 through said bearings and recesses 72.

The recesses 72 support the tool clamp 8 below the cable sheaves 74, and—when seen in a top view of the tool suspension device 7—horizontally in a space enclosed by the traverse frame plate elements 73 that allows pivoting of the upper tool connector 8 around the connector pivot axis 71.

Figure 2A:
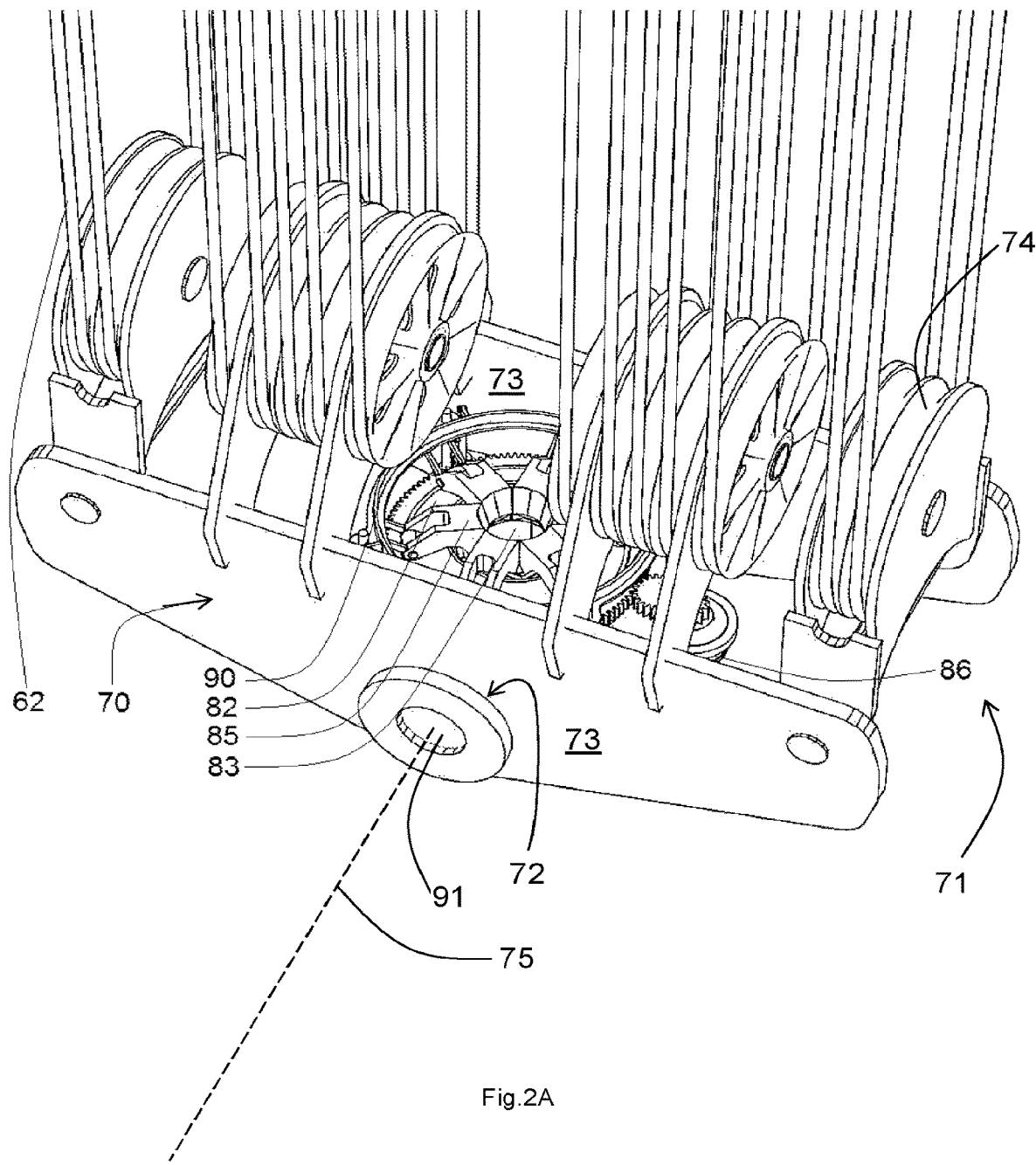
FIG. 2A is a detailed view of the tool suspension device of the system without any tool suspended therefrom.

In FIG. 2A, no tool is suspended from the tool suspension device 7.

Figure 2B:
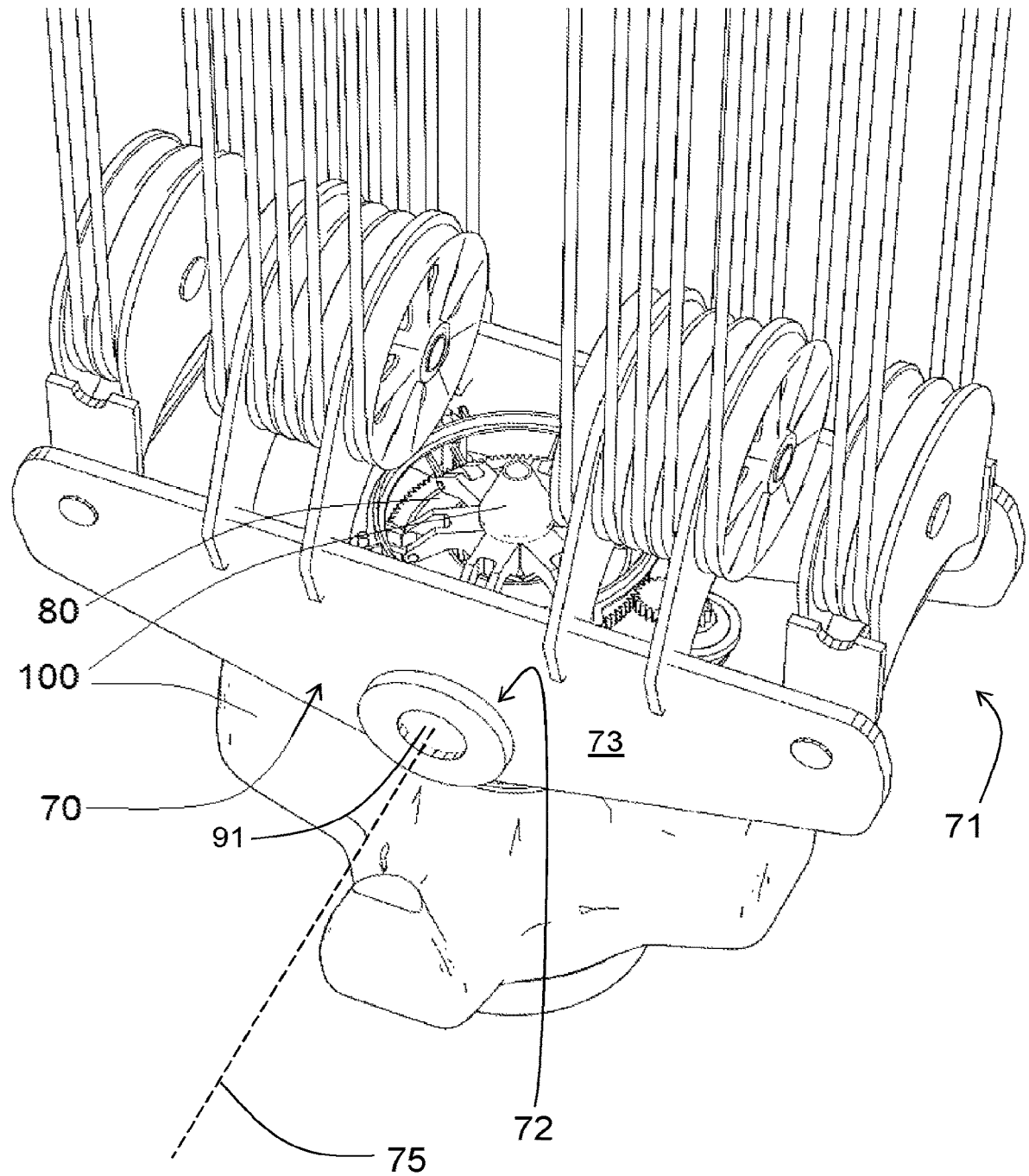
FIG. 2B is a detailed view of the tool suspension device of the system with a tool according to the invention suspended from the tool clamp thereof.
Figure 2C:
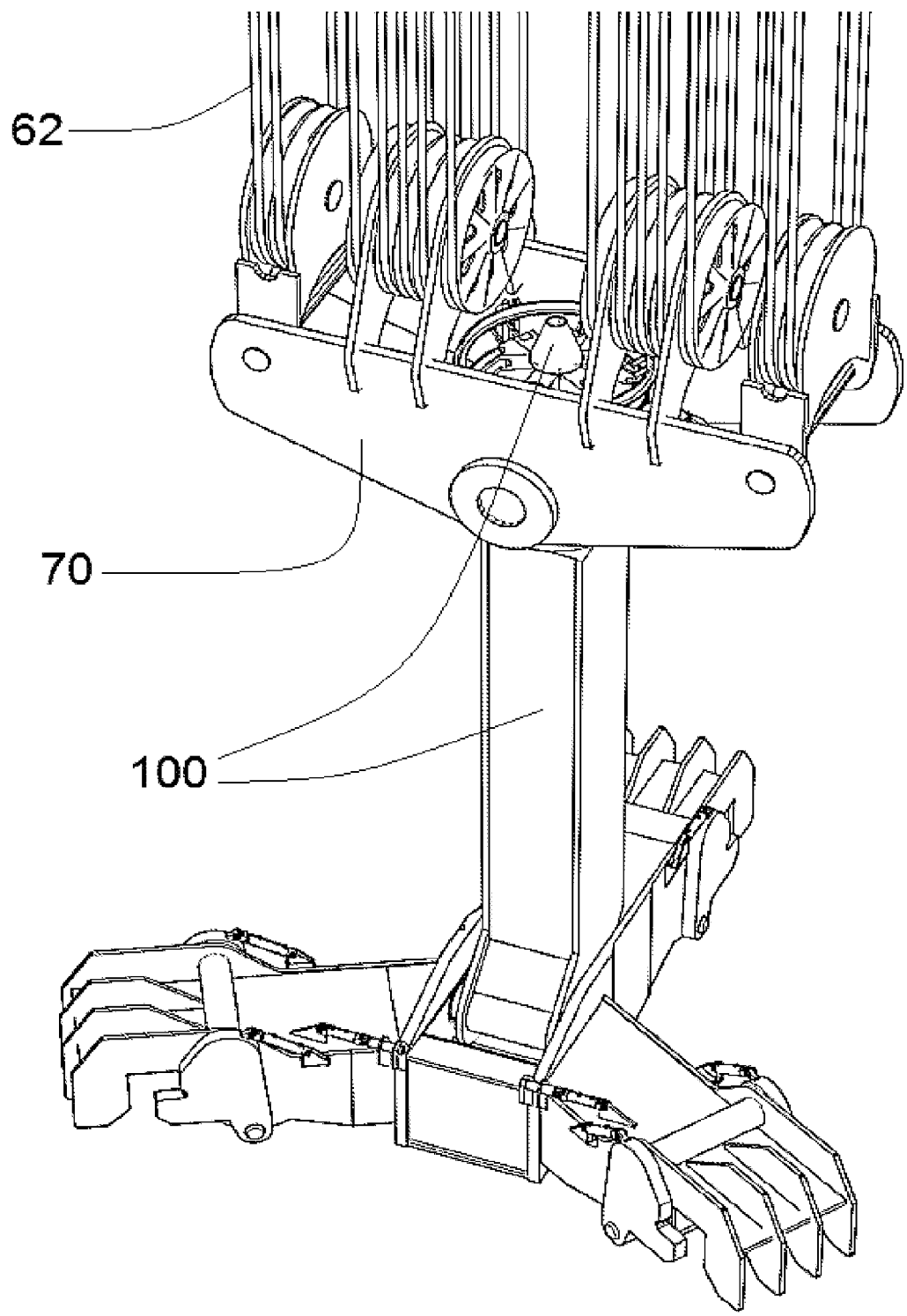
FIG. 2C is a detailed view of the tool suspension device of the system with another tool according to the invention suspended from the tool clamp thereof.
Figure 2D:
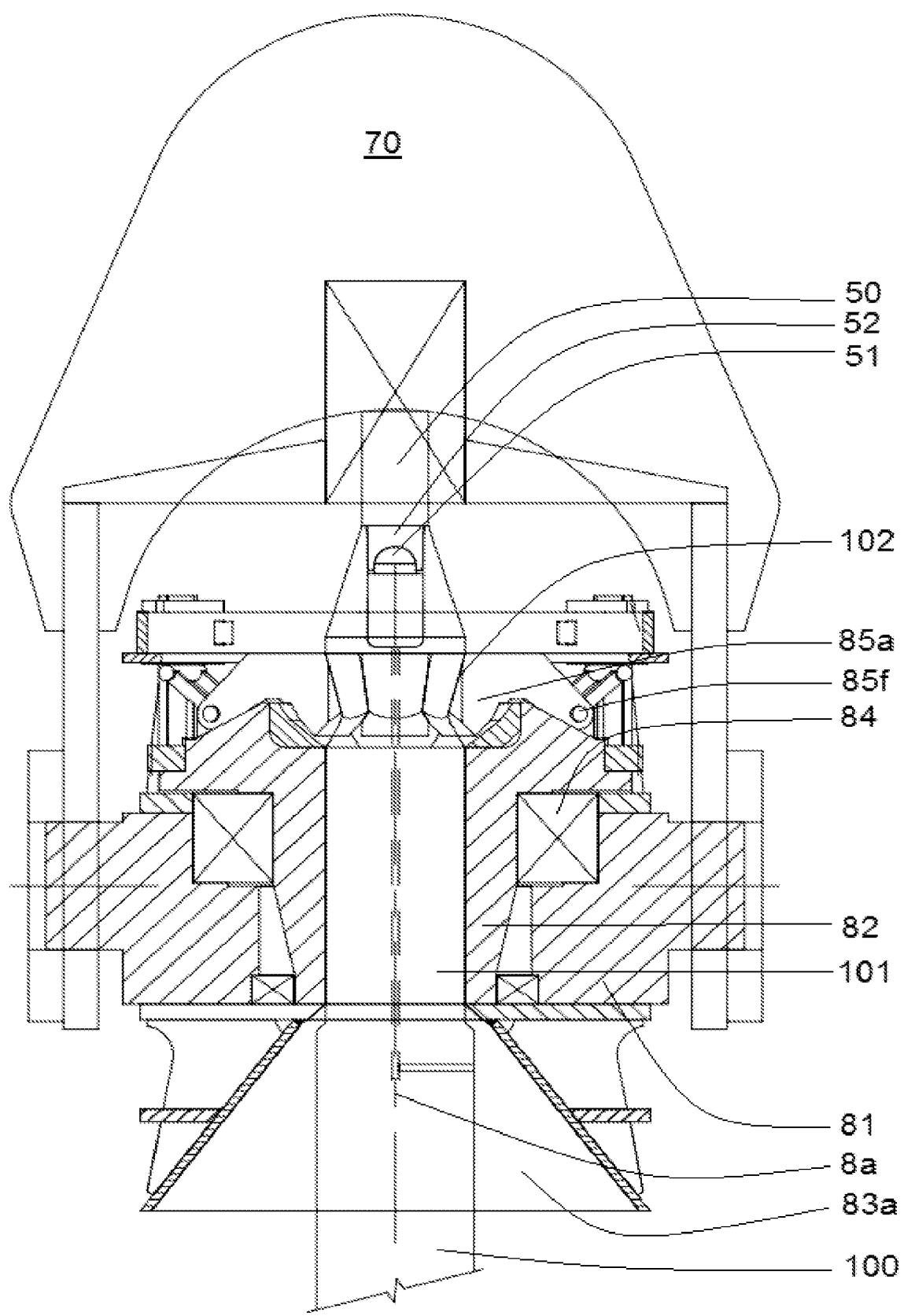
FIG. 2D is a detailed side view of the tool suspension device of the system according to the invention with a tool suspended from the tool clamp thereof.

FIG. 2B shows how the tool 100 from FIG. 1 is being suspended underneath the tool suspension device by means of the tool clamp 8, whereas FIG. 2D shows that a tool 100 suspended as such, has a shank 101 with a shoulder 102.

FIG. 2C shows another tool, a lifting device, being suspended underneath the tool suspension device 7. Again, also this tool 100 has a shank 101 with a shoulder 102 as shown in FIG. 2D.

The tool clamp 8 from FIGS. 2A-E is shown in more detail in FIGS. 3A-E, where it is illustrated that it comprises a clamp housing 81 supported by the travelling block member, a female, open-centered body 82 defining a passage 83 with a central vertical axis 8a to allow passage of the shank 101 of the tool, a thrust bearing 84 mounted to the clamp housing 81 and supporting the body 82, allowing swivelling of the body 82, and multiple mobile tool retainers 85. Each mobile tool retainer 85 is supported by the body 82 and distributed around the passage, so as to each provide an operative and a non-operative position of the mobile tool retainer.

Figure 3A:
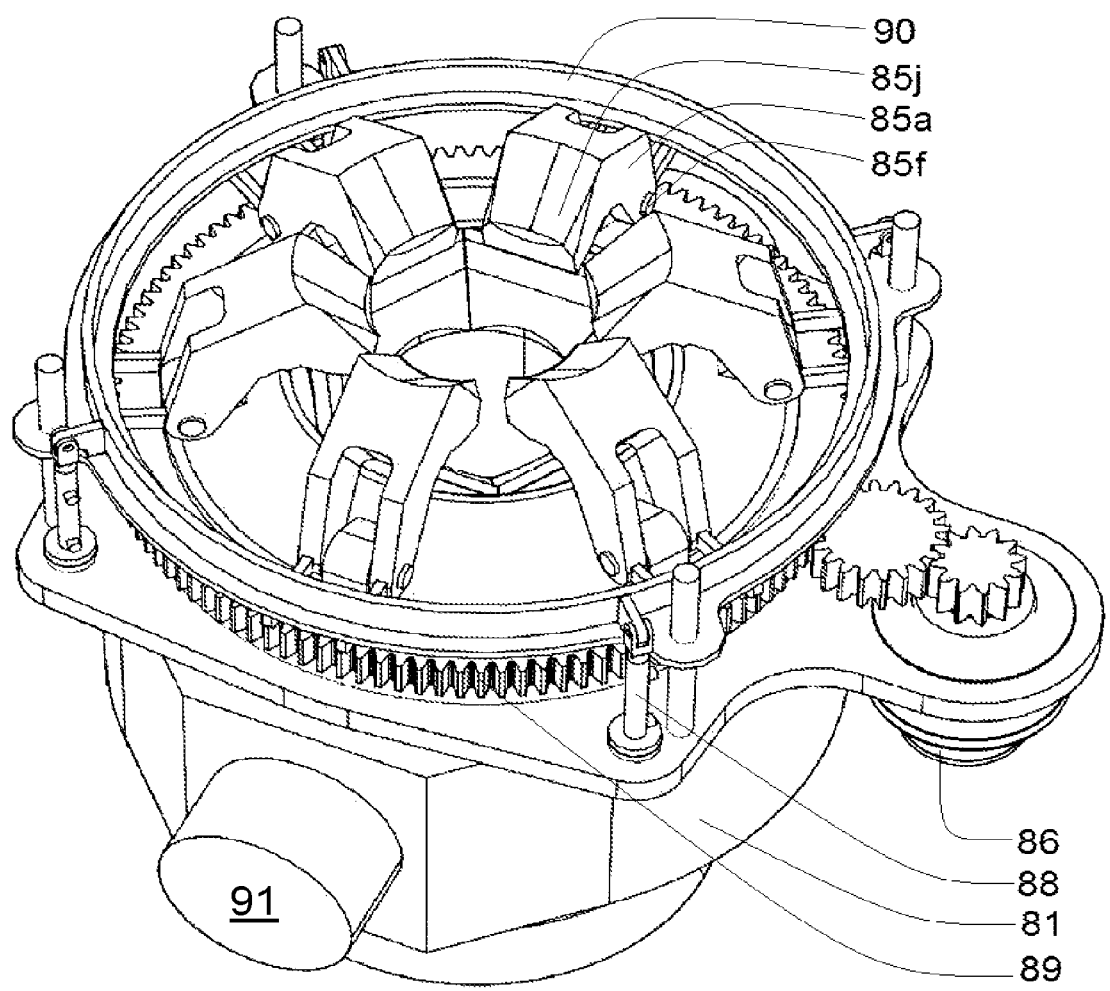
FIG. 3A is a detailed view of a tool clamp according to the invention with the shank of a tool to be suspended from the tool clamp, the tool retainers being in the non-operative position.
Figure 3B:
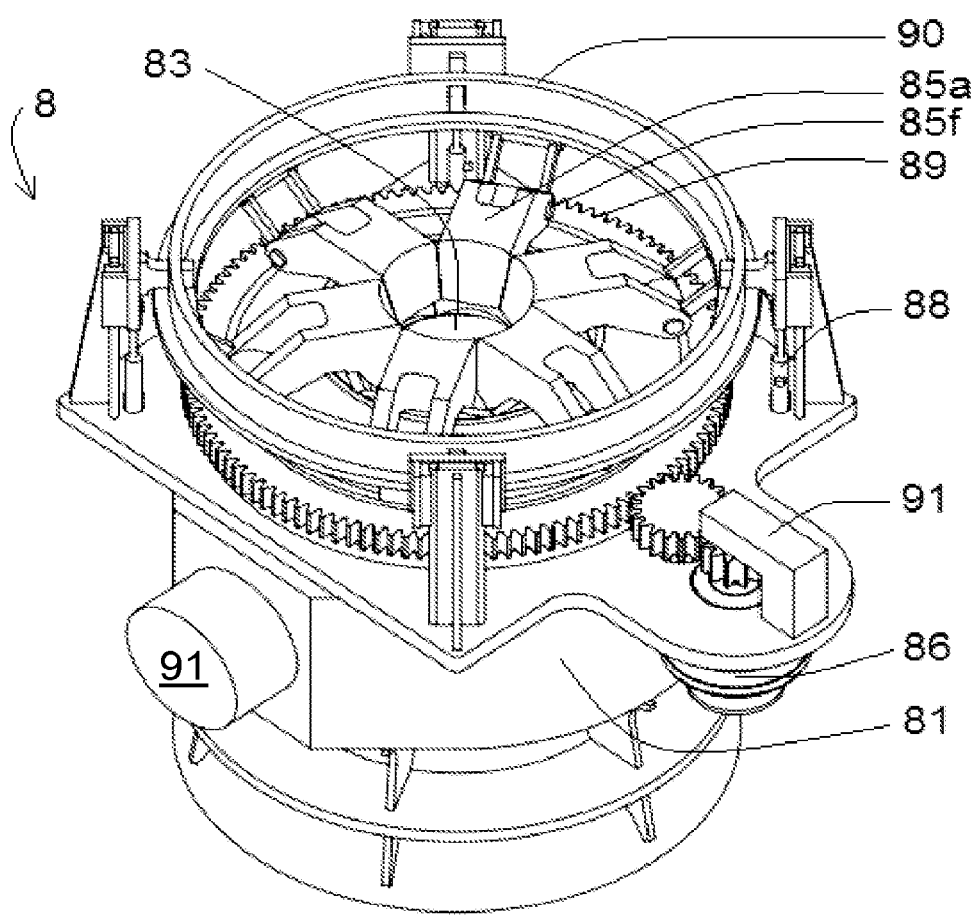
FIG. 3B is a detailed view of a tool clamp according to the invention with the shank of a tool to be suspended from the tool clamp, the tool retainers being in the operative position.

The mobile tool retainers 85 are shown in the non-operative position without any shank 101 being present in FIG. 3A and in the operative position in FIG. 3B. The mobile tool retainers are shown in the same positions in respectively FIGS. 3C and 3D, this time with a shank 101 comprised by a tool, or in a rotationally rigid manner connected or connectable to a tool, being inserted therein.

Figure 2E:
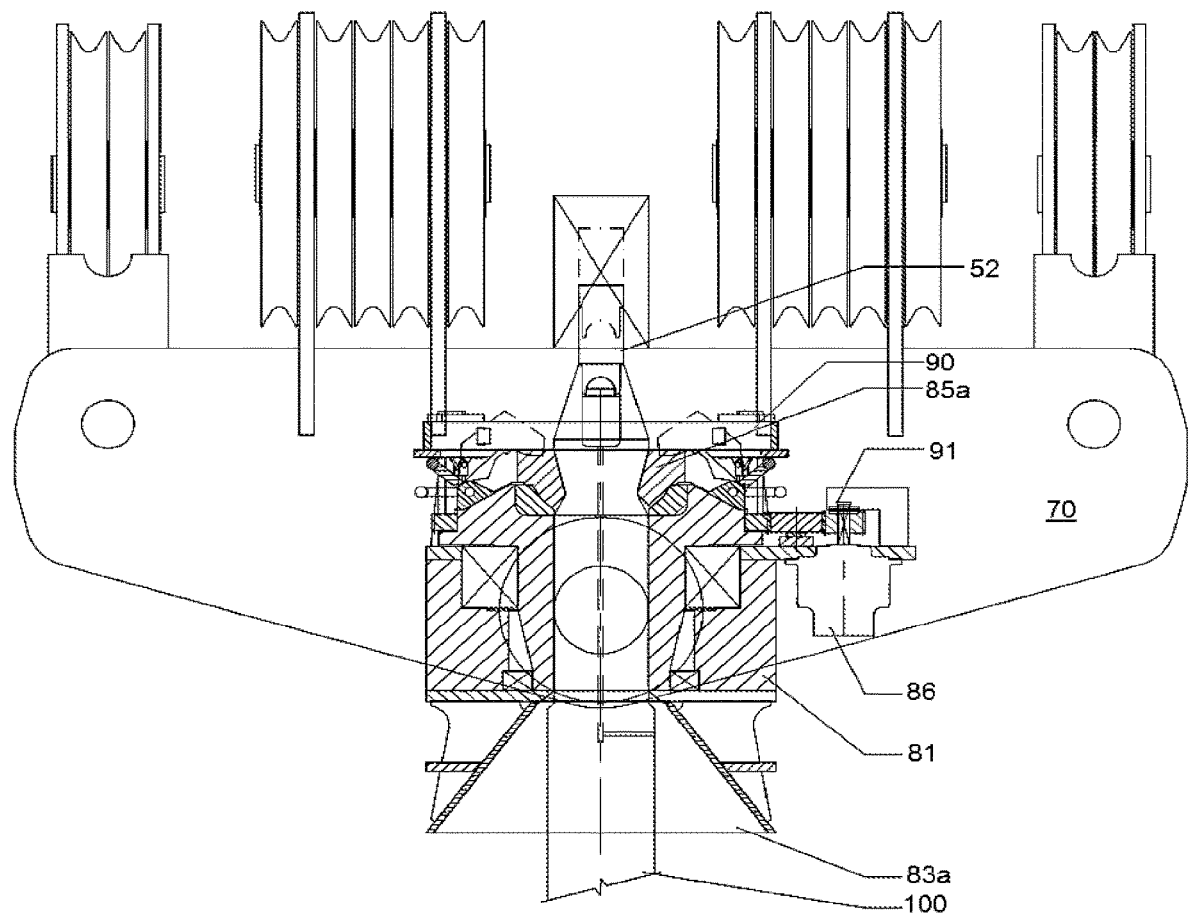
FIG. 2E is a detailed front view of the tool suspension device of the system according to the invention with a tool suspended from the tool clamp thereof.
Figure 3C:
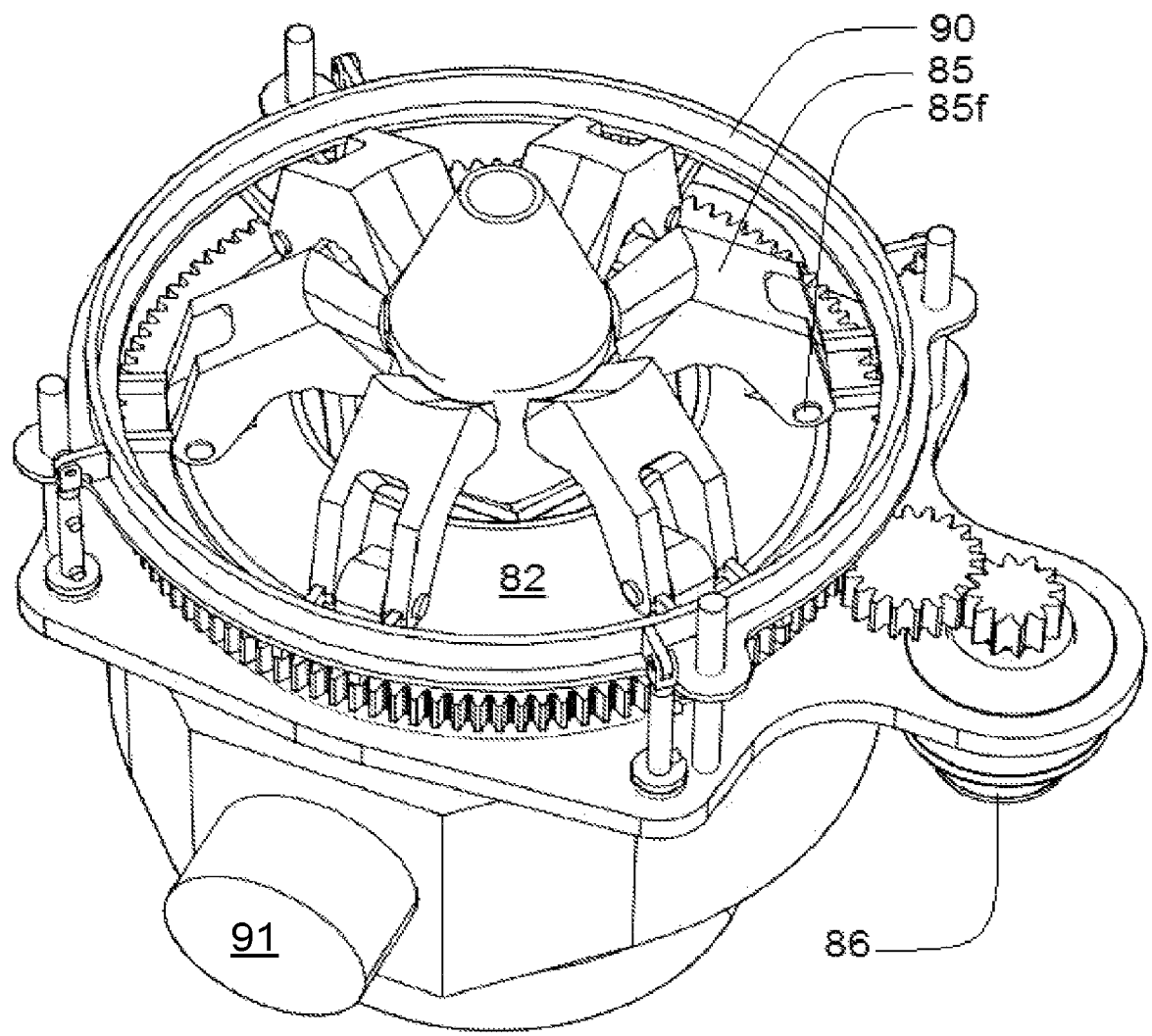
FIG. 3C is a detailed view of this same tool clamp of the invention with the shank being inserted therein, but not being engaged by the mobile tool retainers of the tool clamp, the mobile tool retainers being in the non-operative position.
Figure 3D:
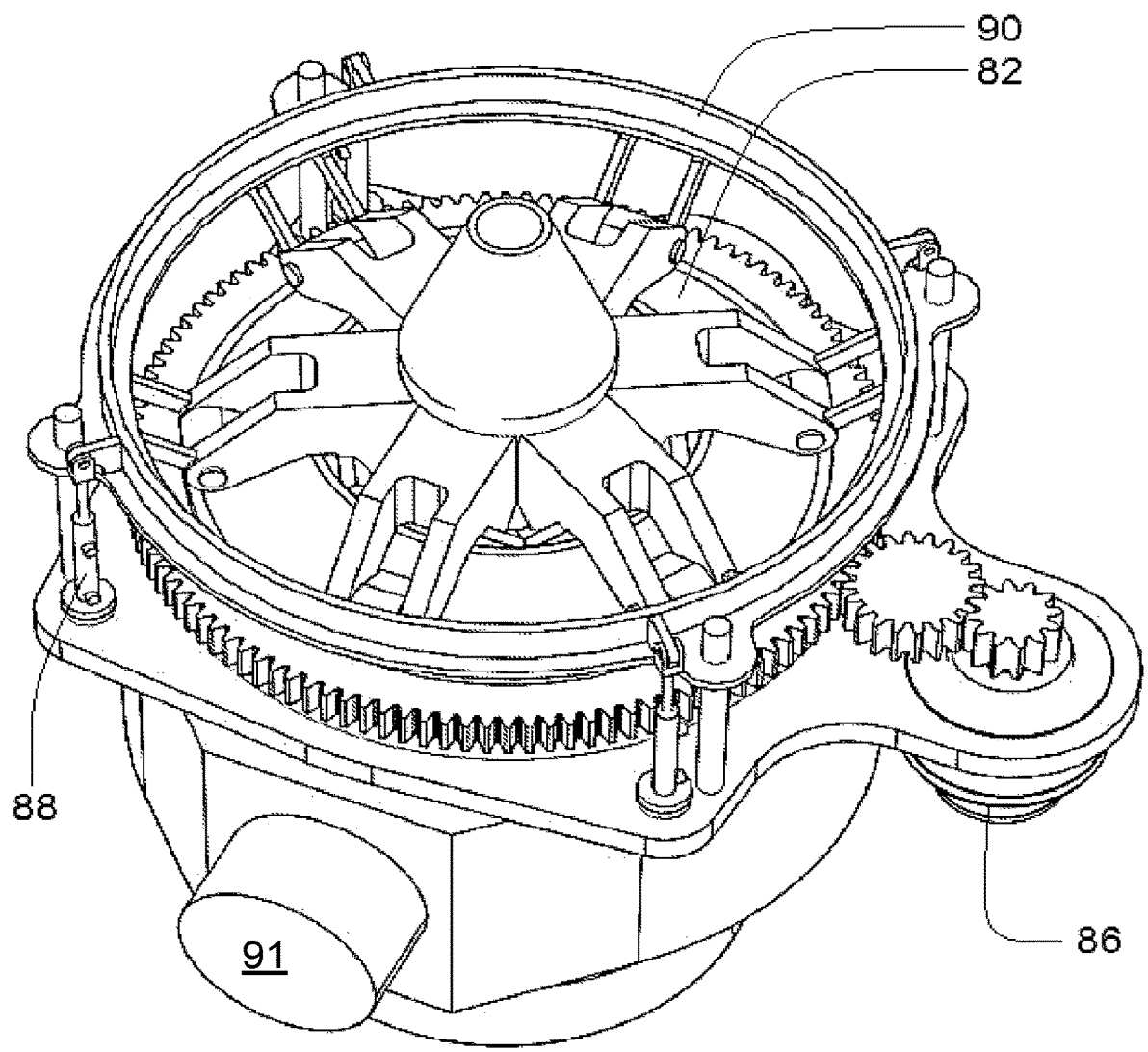
FIG. 3D is a detailed view of this same tool clamp with the shank being engaged by the mobile tool retainers of the tool clamp, the mobile tool retainers being in the operative position.
Figure 3E:
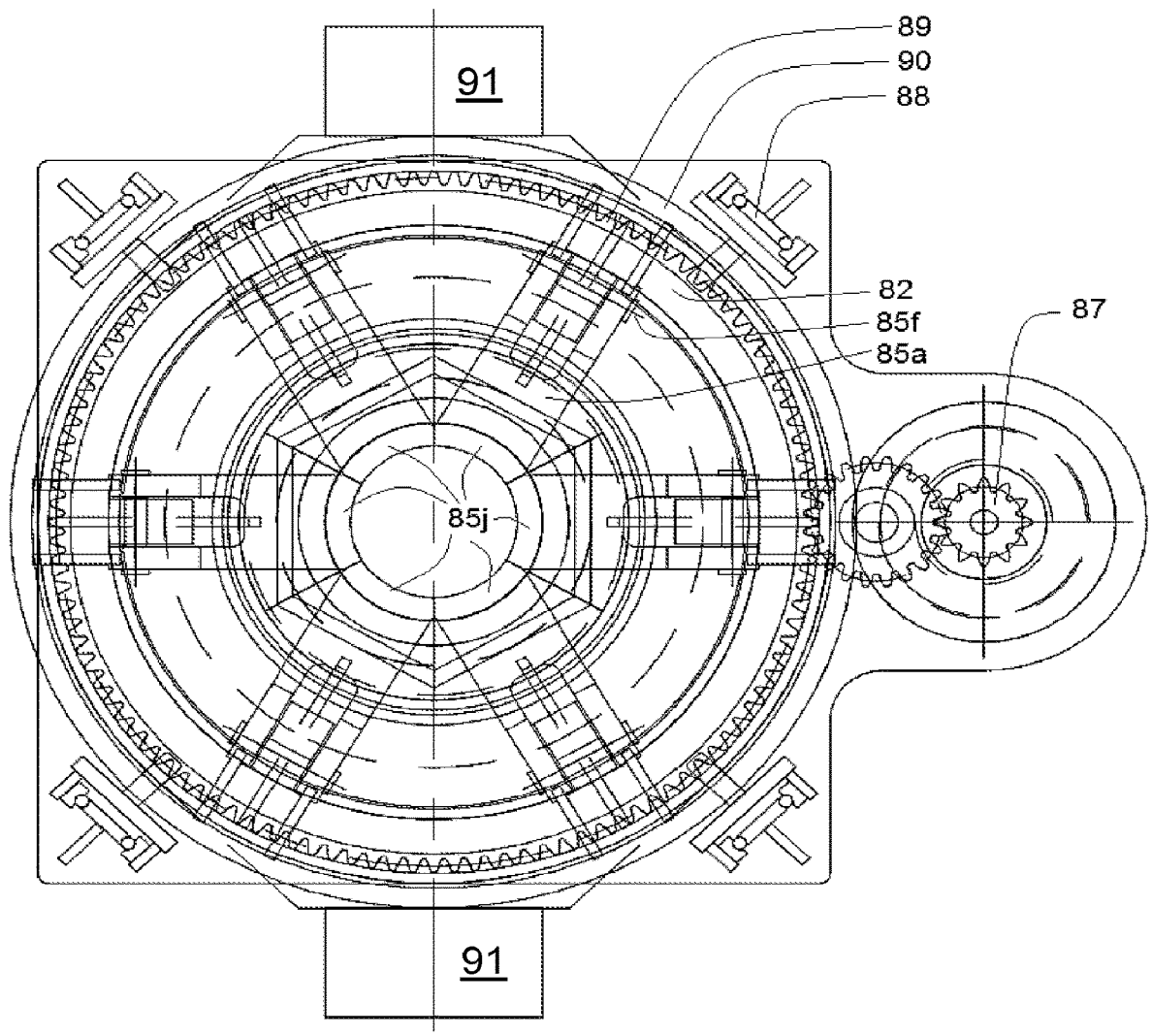
FIG. 3E is a detailed top view of this same tool clamp.

The advancement from FIG. 3C to FIG. 3D shows the shank 101 being engaged by the mobile tool retainers 85 of the isolated tool clamp 8 shown in FIGS. 2A-E, with the result that the tool 100 is suspended from a tool suspension device 7 (not shown) comprising the tool clamp 8, for example in the manner shown in FIGS. 2A-E.

The tool retainers 85 are adapted to in the non-operative position shown in FIGS. 3A and 3C allow passage of the shank 101 of the tool 100 from below through the passage 83 and to in the operative position shown in FIGS. 3B and 3D engage below the shoulder 102 of the shank 101 extending through the passage 83 so as to suspend the tool 100 from the tool clamp 8.

Figure 4A:
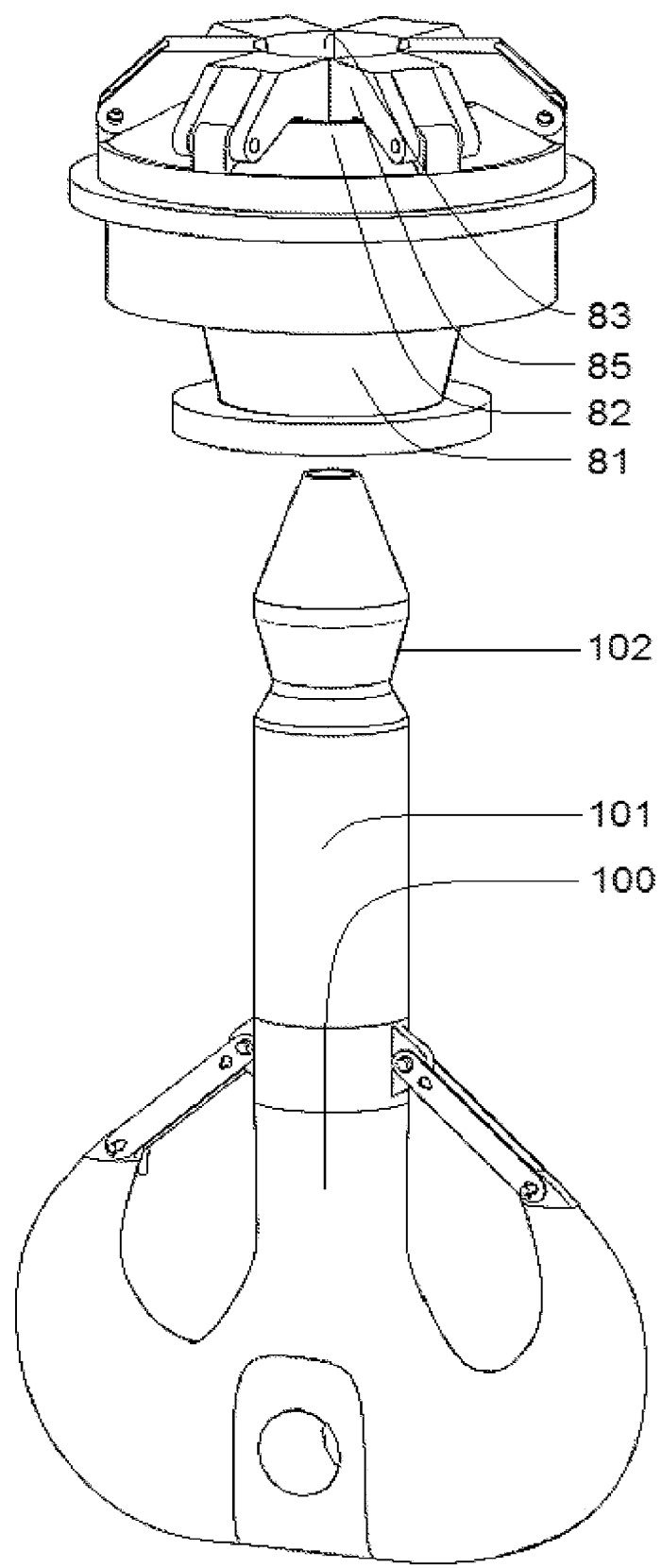
FIG. 4A shows a tool clamp of the invention and a tool with a shank prior to being inserted in the tool clamp, the tool retainers being in the operative position.
Figure 4B:
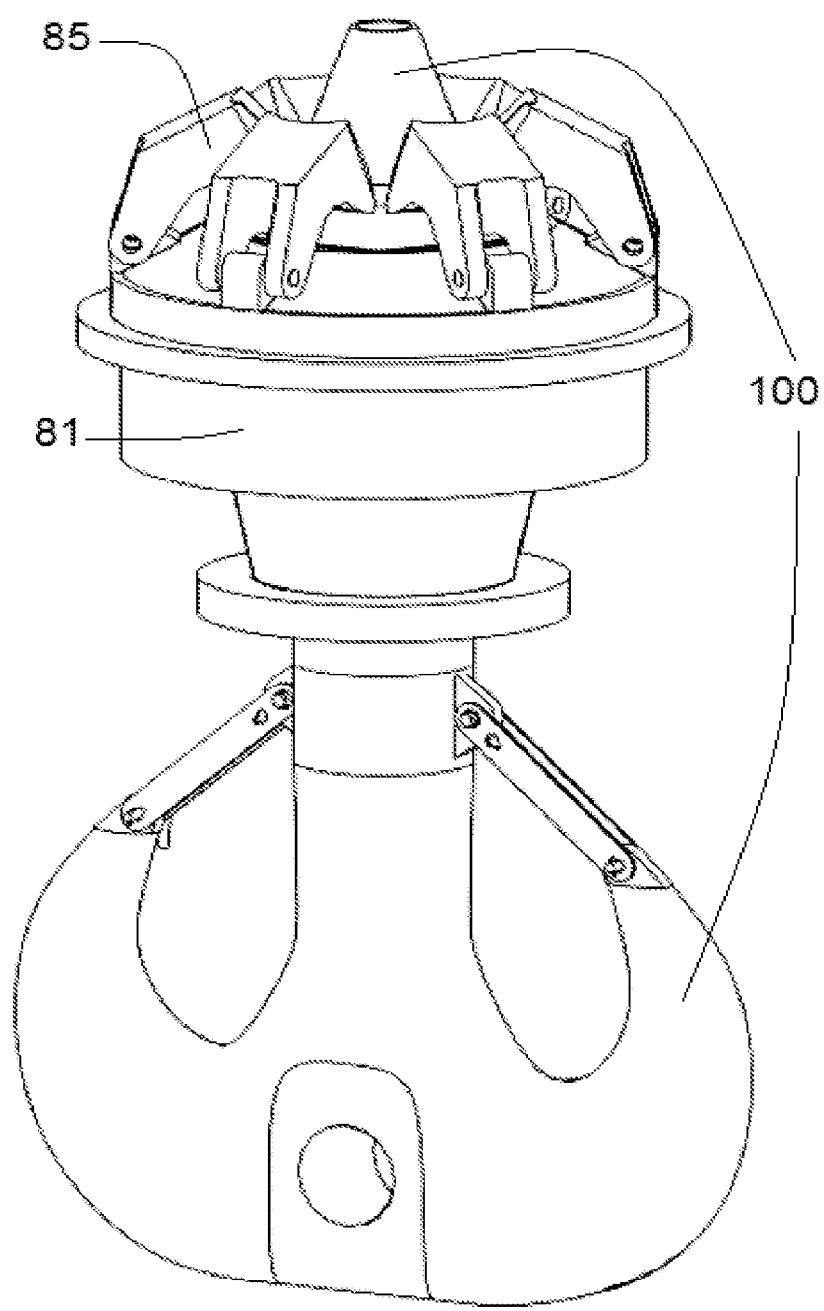
FIG. 4B shows the same tool clamp and tool, the mobile tool retainers being in the non-operative position, the shank of the tool being inserted in the tool clamp.
Figure 4C:
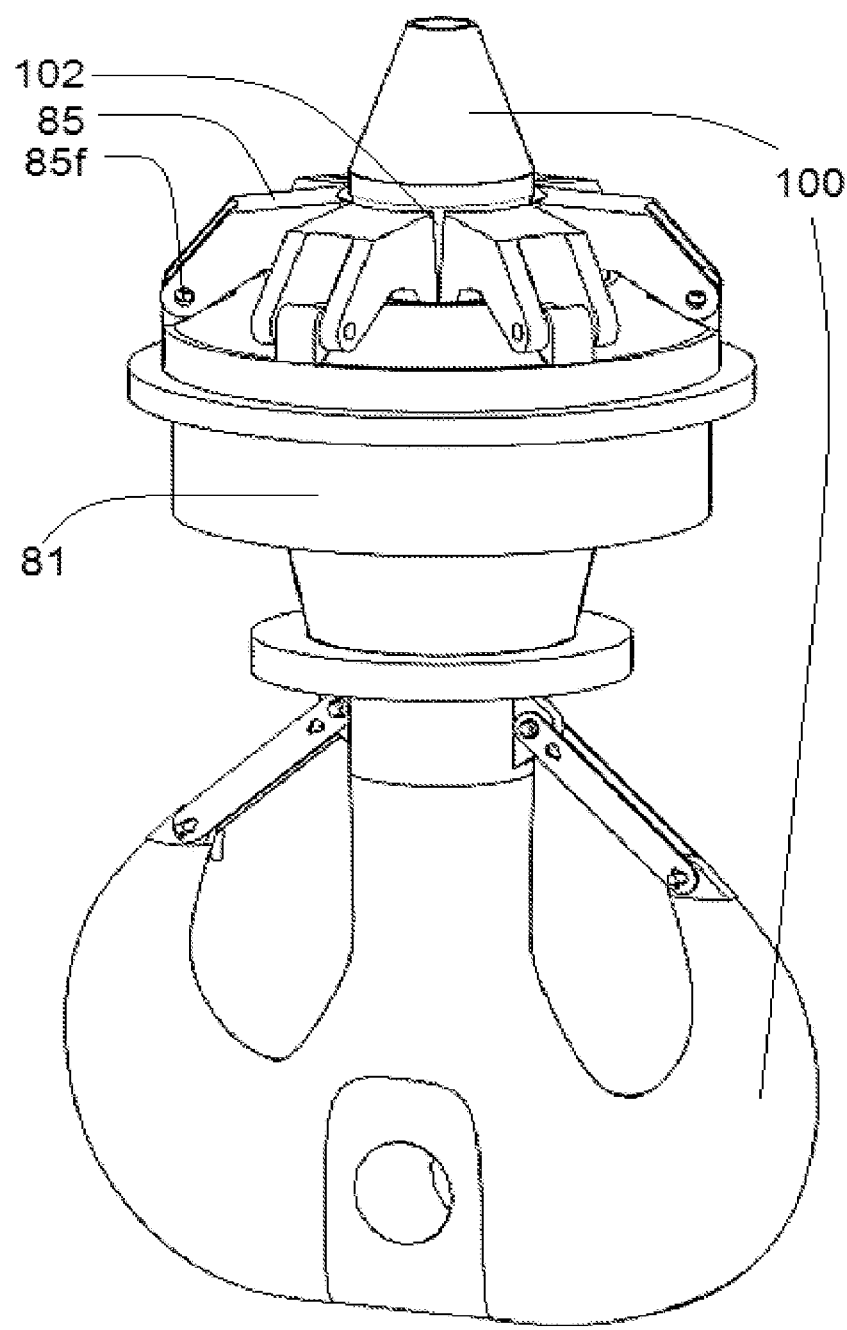
FIG. 4C shows the same tool clamp and tool, the shank being inserted therein, the mobile tool retainers being in the operative position engaging the shoulder of the shank.

The advancement from FIGS. 4A-C shows the shank 101 of a tool 100 being inserted—advancing from FIG. 4A to 4B—and then engaged—advancing from FIG. 4B to 4C—by another isolated tool clamp 8, with the result that the tool 100 is suspended from a tool suspension device 7 (not shown) comprising the tool clamp, for example in the manner shown in FIGS. 2A-E.

In FIG. 4A, and in FIG. 4C, the mobile tool retainers 85 are in the operative position. The tool retainers 85 are adapted to in this operative position engage below the shoulder 102 of the shank 101 extending through the passage 83 so as to suspend the tool 100 from the tool clamp 8.

In FIG. 4B, the mobile tool retainers 85 are in the non-operative position. The tool retainers 85 are adapted to in this non-operative position allow passage of the shank 101 of the tool 100 from below through the passage 83.

Figure 5A:
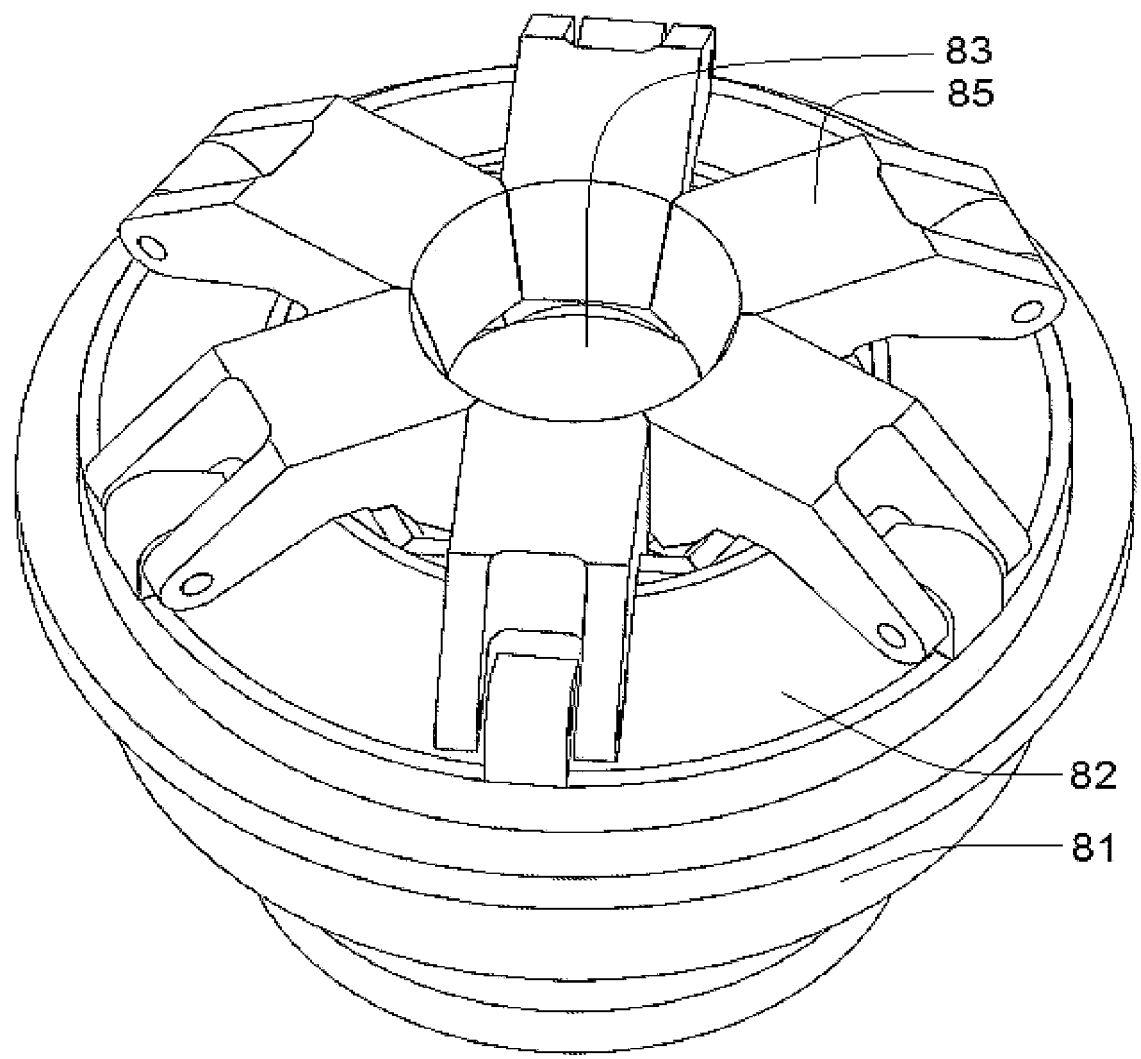
FIG. 5A is a detailed view of a tool clamp of the invention without any shank being inserted therein, the mobile tool retainers being in the operative position.
Figure 5B:
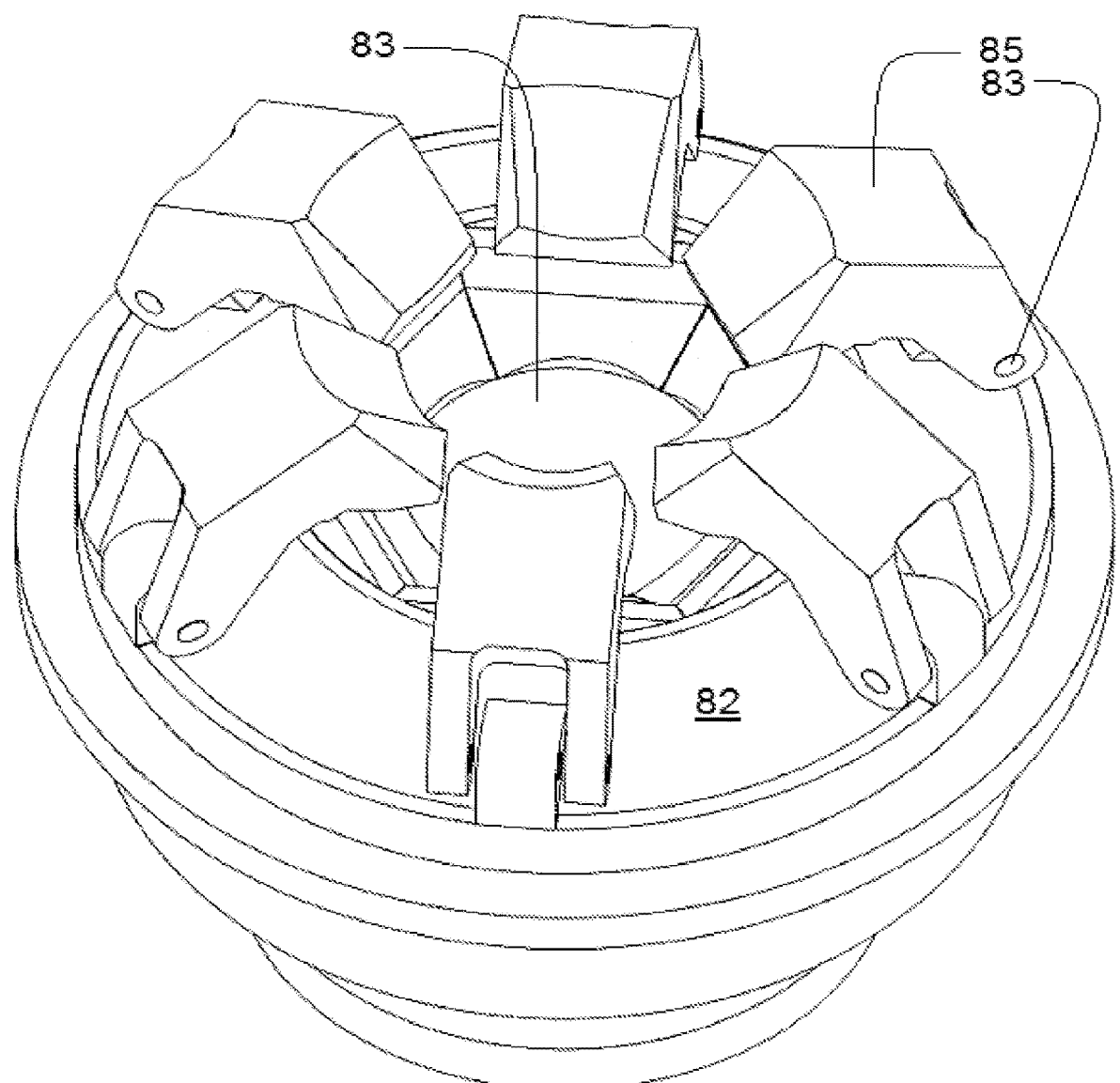
FIG. 5B is a detailed view of this tool clamp without any shank being inserted therein, the mobile tool retainers being in the non-operative position.

The tool clamp 8 of FIGS. 4A-C is shown without the tool 100 in FIGS. 5A and 5B, with the mobile tool retainers 85 respectively in the operative and non-operative position.

FIGS. 7A-B show an individual tool retainer 85 of a tool clamp 8, respectively in an operative and a non-operative position. FIGS. 7C-D show the same tool retainer 85, respectively in an operative and a non-operative position, respectively engaging below the shoulder 102 of shank 101 and allowing passage of this shank from below through the passage 83.

A tool clamp 8 shown in the figures is configured to engage the shank 101 of the tool 100 in a rotational direction of the body 82 by means of friction at the interfacing surfaces emanating from the weight of the tool 100.

In the embodiments of the tool clamp 8 shown in the figures, the mobile tool retainers 85 are each embodied as a lever comprising an arm 85a and a fulcrum 85f, which fulcrum 85f is fixed to the body 82 and wherein one end of the arm is adapted to—in the operative position—engage the shoulder 102 of the shank 101 of the tool 100, and in the non-operative position has cleared the area in line with the passage 82 to allow the passage of a shank 101 of the tool 100. For the embodiments shown in FIGS. 2A-E, 3A-E, and 6A-B it is shown that the other end of the arm is operable by an actuator 88 to move the opposite end of the arm 85a between the operative and the non-operative position.

The mobile tool retainers 85 have a clamping jaw 85j, best shown in FIG. 3A, to engage on the shoulder 102 of the shank 101 of the tool 100. This is preferably an exchangeable clamping jaw to be able to match the dimensions and/or shape of the mobile tool retainers to that of the shank 101 of the tool 100.

Another configuration of the control ring and mobile tool retainers, and a shape of the latter, is shown in Figure The body 82 is embodied as a vertical cylinder with a flanged top end supporting the mobile retainers 85. A thrust bearing 84 supports the flanged top end of the body 82 relative to the housing.

The tool clamp 8 of FIGS. 2A-E and 3A-E, and 6A-B further comprises a rotational drive 86 operative between the clamp housing 81 and the body 82 such as to—in the operative position—drive a rotation of the body 82, and along with it the mobile tool retainers 85, and thereby the tool, relative to the clamp housing 81 around the central vertical axis 8a of the tool clamp 8.

The driving torque of driving shaft 87 of the rotational drive 86 generated by the rotational drive 86 is optionally, and not shown in the figures, transmitted to the body 82 via a clutch, externally switchable to couple and decouple the driving shaft 87 to and from the body 82, respectively, such that its rotation is driven by, and freewheels from, the rotational drive 86, respectively. Another option is that the rotational drive comprises a differential with an operable brake, which in a retracted condition allows, and in an active condition blocks the rotational drive to transmit a driving torque of a driving shaft 87 of the rotational drive 86 generated by the rotational drive 86 to the body 82 via the differential, respectively, in such that in said retracted and active condition the rotation of the body 82 is driven by, and freewheels from the rotational drive 86, respectively.

The body 82 of the tool clamp is provided with a cogwheel 89, best shown in FIGS. 3A-E, which is engaged by one or more gears transmitting the driving torque of the driving shaft 87 of the rotational drive 86 for driving the rotation of the body 82. The cogwheel 87 is an outwardly cogged cogwheel enclosing the outer circumference of the body 82.

Figure 6A:
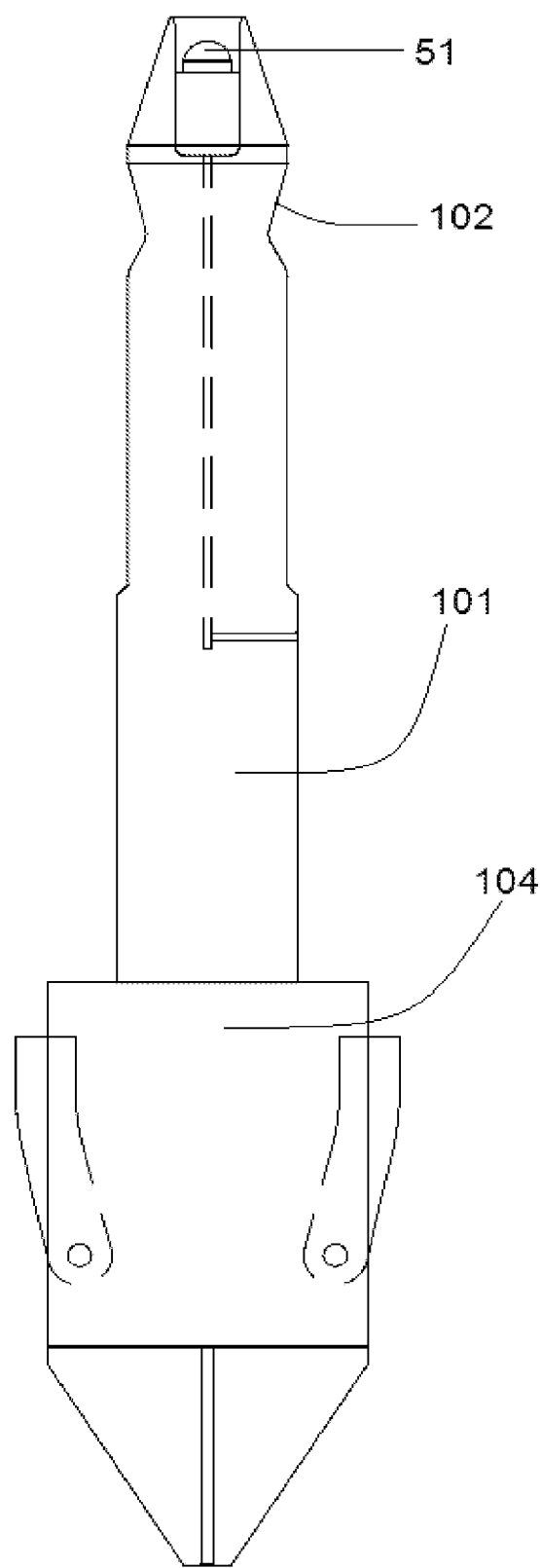
FIG. 6A is a schematic front view of a male-to-male adapter of the invention.
Figure 6B:
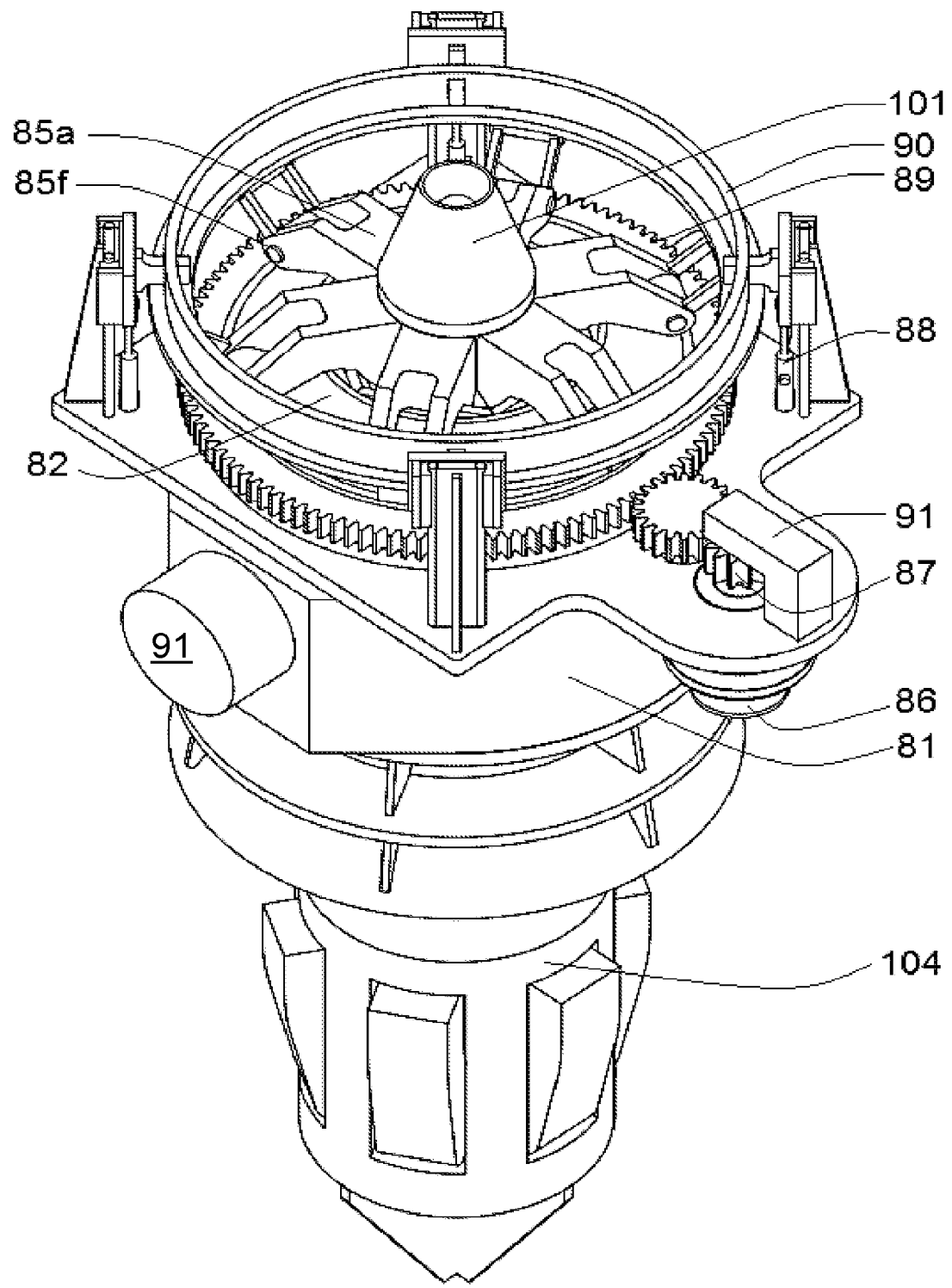
FIG. 6B is a detailed perspective view of a male-to-male adapter of the invention being engaged by a tool clamp of the invention, with the mobile tool retainers in the operative position.
Figure 6C:
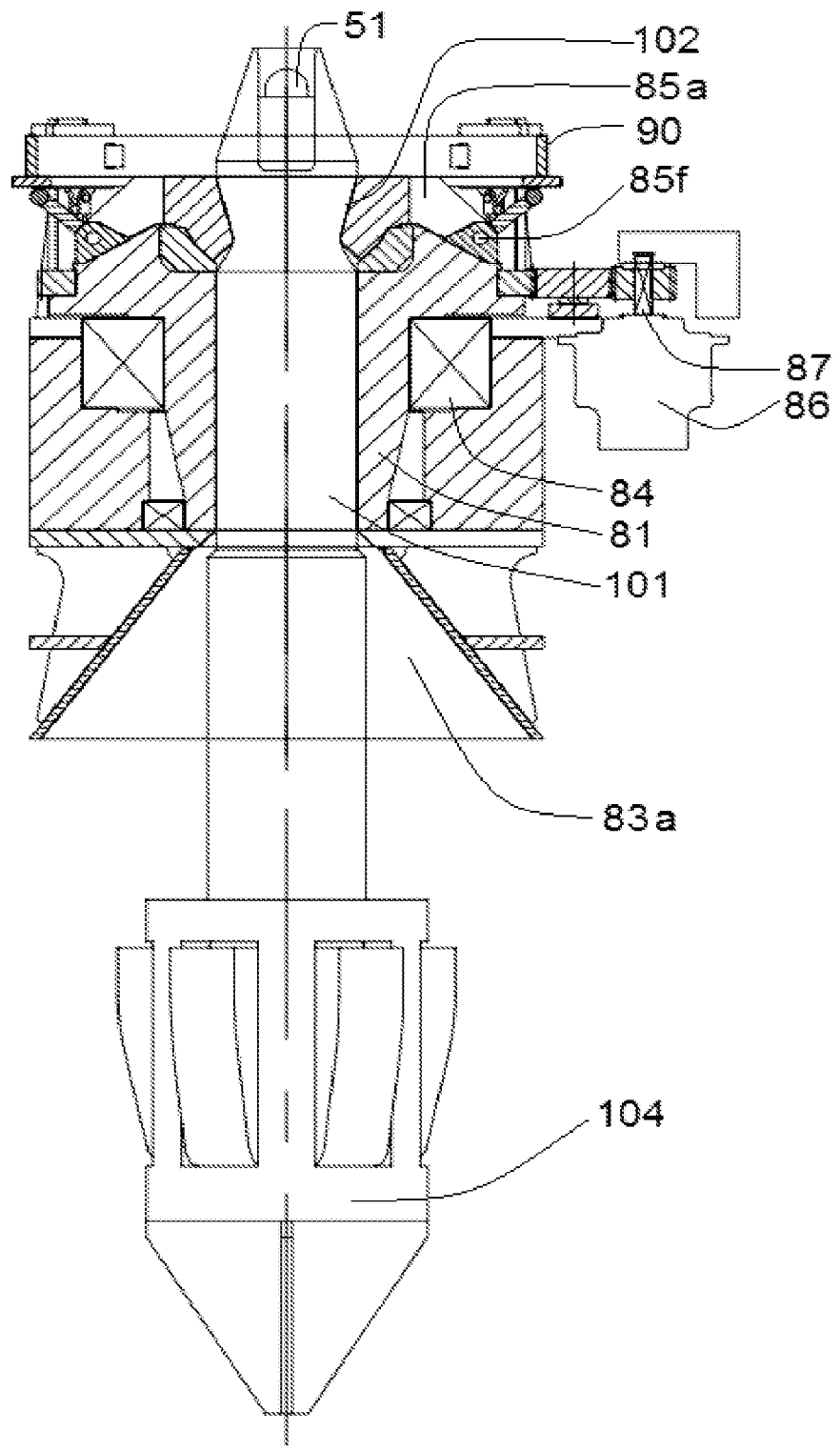
FIG. 6C is a detailed front view of this male-to-male adapter of the invention being engaged by the same tool clamp of the invention, with the mobile tool retainers in the operative position.

FIGS. 6A-6C illustrate a tool configured as a male-to-male adapter 200 with shank 101 provided with the shoulder 102 at a first end of the shank 101, and with a male tool connector 104 at the opposite end of the shank 101. The system then further comprises one or more further tools (not shown here) that each have a female tool counterconnector that is configured to mate with the male tool connector of the male-to-male adapter tool, e.g. as shown in WO2018/139931.

It is illustrated that the male tool connector 104 has a head 105, e.g. a conically pointed head, and a circumferential array of outwardly pivoting latch members 106 that are embodied to engage underneath a flange of a bore of the female counterconnector into which the head is received.

Providing this male-to-male adapter tool 200 extends the range of tools that can be suspended from the tool suspension device, as it e.g. also enables to suspend tools, e.g. existing tools, that are provided with female tool counterconnectors, and not only tools comprising the shank.

When the shank 101 of the adapter tool 200 is connected to the further tool (not shown) via the interconnection of the male connector 104 and the female tool counterconnector, and the shank 101 is inserted into the tool clamp 8 and engaged by the clamp as shown in FIGS. 6B-C, the tool is as a result suspended from the clamp 8 and thereby from the tool suspension device 7 (not shown).

The travelling block member 70 of the tool suspension device 7 shown in FIGS. 2A-E is integral with a bottom block comprising one or more cable sheaves, so that the tool suspension device 7 is suspended by the one or more winch driven cables 62 in a multiple fall arrangement. Not shown is that this bottom block may form a lower part of a splittable block, comprising multiple sheaves through which the one or more hoisting cables 62 are run, which multiple sheaves comprise a plurality of loose sheaves, vertically movable, e.g. by means of a trolley guided on vertical rails of the crane, between the jib and the bottom block, and a plurality of fixed sheaves secured to the bottom block, such as to vary the number of cable falls extending upwardly from the bottom block.

As shown in FIGS. 2D and 2E, the passage 83 of the tool clamp 8 shown evolves at a lower end thereof into a downwardly diverging funnel for assisting in the alignment of the shank with the passage 83 at the start of the insertion thereof from below.

Not shown is that the tool clamp 8 is provided with one or more sensors and/or imaging devices, e.g. camera's, determining and/or recording locations and/or positions and/or displacements and/or mechanical parameters such as strain, of parts of the tool clamp 8 and/or the shank 101 of the tool 100, provided with a data connection to a digital monitoring system for monitoring a correct operation of the tool clamp 8, that is, at least, to enable a passage of the shank 101 of the tool 100 through the passage 83 in the non-operative position and an engagement of the shank 101 extending through the passage 83 in the operative position, so as to suspend the tool 100 from the tool clamp 8.

Electrical power and/or data, e.g. sensor data and/or camera data, if employed by the tool clamp 8, may be transferred therefrom by means of inductive connectors, e.g. wet-mate inductive connectors, e.g. as used in subsea applications.

Figure 8:
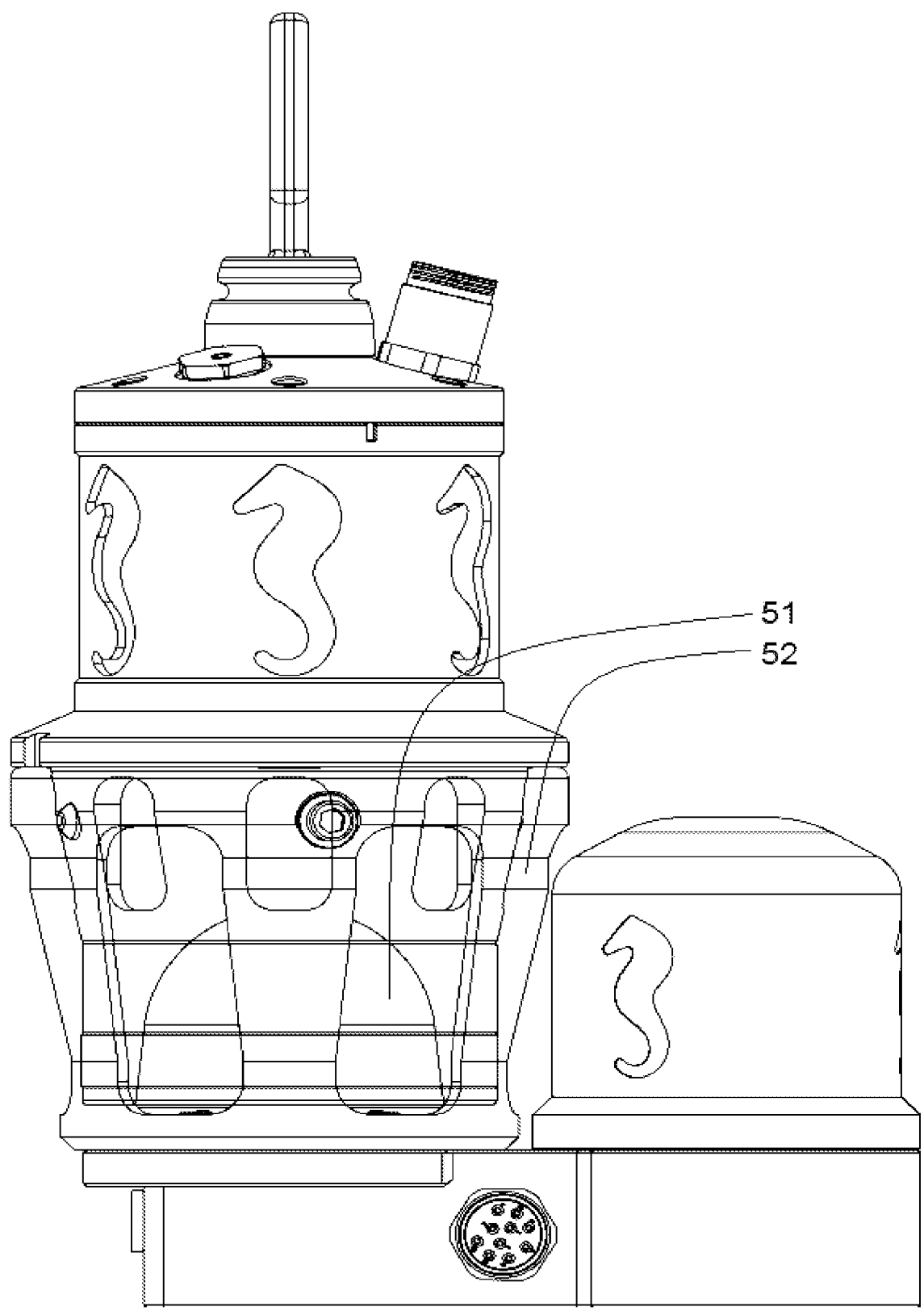
FIG. 8 is a front view of a subsea inductive connector, with the male part being inserted into the female part.

In FIG. 8 an inductive connector 5 is shown which may be comprised by the system. The male part 51 and female part 52 of the connector 5 are shown as being interconnected.

In FIGS. 6A and C, it is shown that the shank 101 comprises a male part 51 of an inductive connector 5, to which a female part 52 of the connector 5 is connectable for providing electricity to equipment on the tool and/or on the load carried by the tool. A wire extends from part 51 via the shank, e.g. through a passage within the shank running from the male part 51 downwards through the shank. This configuration obviates the use of an umbilical for the electricity supply to such equipment.

In FIGS. 2D and 2E, male and female parts 51, 52 are shown being interconnected (solid lines) and disconnected (dashed lines).

FIGS. 9-12 show further embodiments of the system according to the invention.

By solid lines, the shank 101 is shown being inserted into the shank receiving passage 83 and its shoulder 102 being engaged by the mobile tool retainers 85, the mobile tool retainers being pivoted inwardly around the fulcrum 85f into the operative position. The dashed lines show the shank 101 being inserted while the mobile tool retainers 85 are in the non-operative position, being pivoted outwardly around the fulcrum 85f and not engaging the shoulder 102 of the shank 101, e.g. before or after engagement by the mobile tool retainers, so prior to being lowered while the mobile tool retainers 85 moved to the operative position, or after being lifted while the mobile tool retainers 85 moved to the non-operative position.

Figure 9:
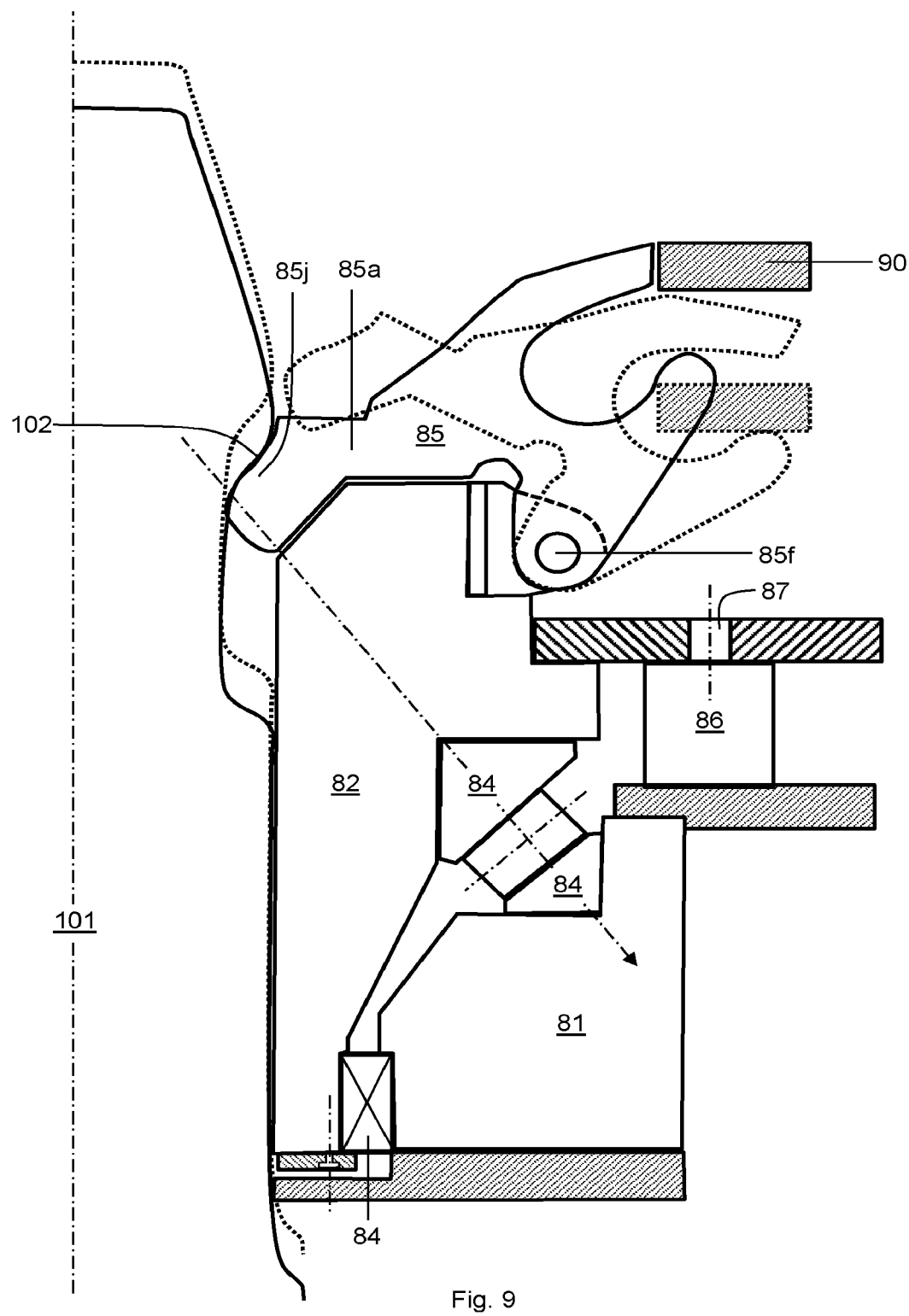
FIGS. 9-12 are radial cross-sections of embodiments of a system according to the invention with a tool being suspended from the tool clamp (solid lines), and being released therefrom (dashed lines).
Figure 10:
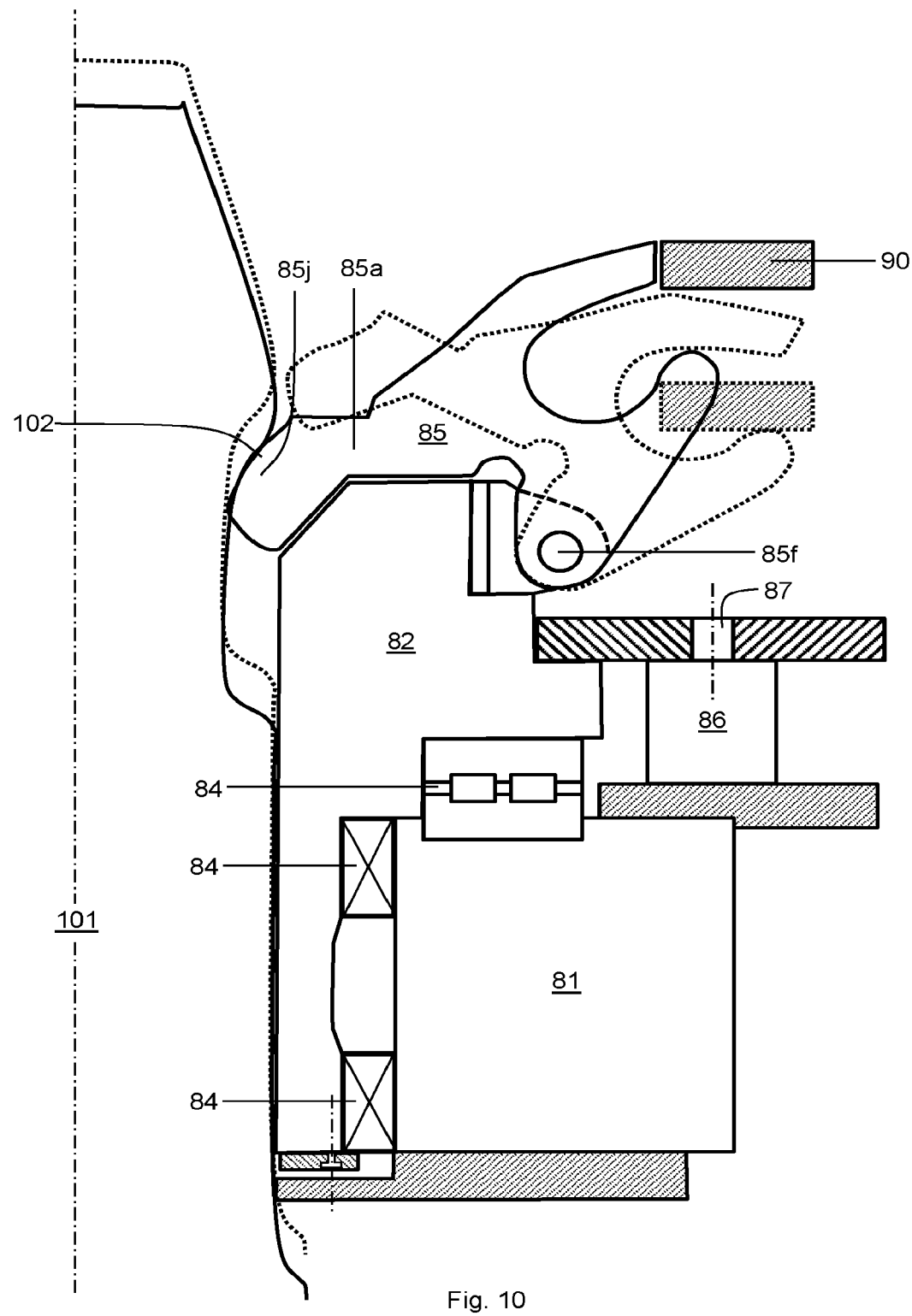
Figure 12:
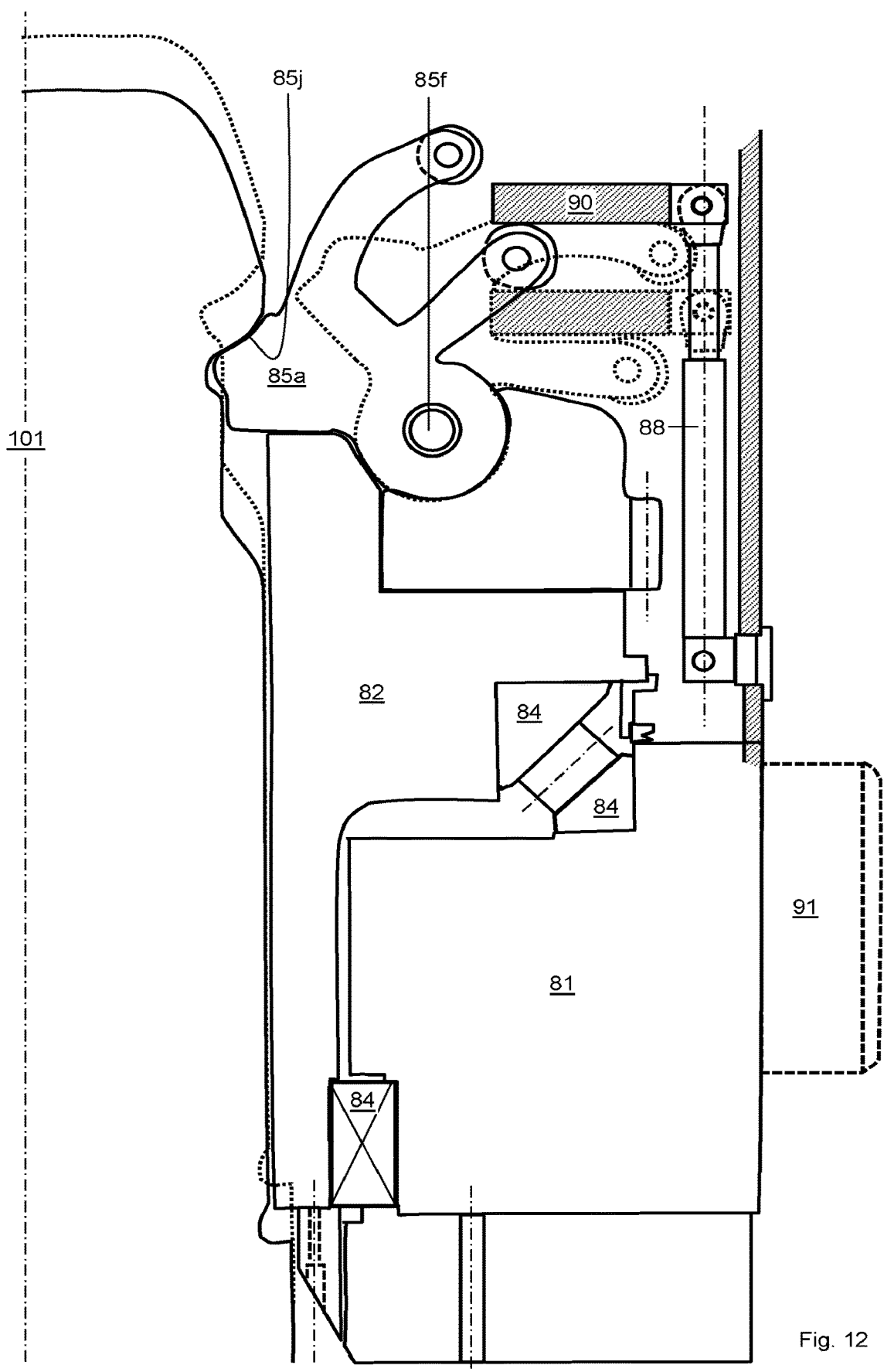

In the embodiments of FIGS. 9, 10 and 12, each of the mobile tool retainers 85 comprises at the radially outer end thereof a lower control ring engagement surface, which extends underneath the control ring 90, and an upper control ring engagement surface, which radially adjoins the inner circumference of the control ring 90 in the operative position of the mobile tool retainer 85. The lower control ring engagement surface is such that the control ring 90, when moving downwards through the action of actuator 88, to move the mobile tool retainers 85 from the operative to the non-operative position, engages the lower control ring engagement surfaces such as to push the radially outer ends of the mobile tool retainers 85 downwards, pivoting them to the non-operative position. The upper control ring engagement surface is such that the control ring 90, when the mobile tool retainers are in the operative position thereof, radially engages the upper control ring engagement surface upon any pivoting movement thereof. The control ring thereby establishes a form-lock of the mobile tool retainers 85, securing the mobile tool retainers 85 in the operative position.

In all embodiments shown, a shoulder engagement surface of each mobile tool retainer 85 at the radially inner end thereof, which engages the shoulder of the shank in the operative position of the mobile tool retainers, extends inclined downwards in the radially inward direction.

In the embodiments of FIGS. 2-7 and 11 the shoulder engagement surfaces are straight without curvature.

In the embodiment of FIG. 12 the shoulder engagement surfaces are concave or spherical, so that the mobile tool retainers 85 together define the shape of a part of a bowl or a ring segment of a sphere, when in the operative position. The shoulder engagement surfaces are convex or spherical in the embodiment of FIG. 10, and curved in a slight S-form in the embodiment of FIG. 9.

As is preferred, the figures show that the engagement surfaces of the shoulder 102 that are engaged by said shoulder engagement surfaces of the mobile tool retainers 85 are shaped complementary to the shoulder engagement surfaces of the mobile tool retainers 85. It is for example visible that in the embodiment of FIG. 10 wherein the shoulder engagement surfaces of the mobile tool retainers 85 are spherical, the engagement surfaces of the shoulder 102 are spherical with substantially the same curvature, such as to match the shoulder engagement surfaces in the operative position of the mobile tool retainers 85.

In the embodiments depicted, a line of force runs, for each mobile tool retainer, inclined downwards and radially outwards from the interface between the shoulder of the shank and the mobile tool retainer, when the shank, and thereby the tool, is suspended from the tool suspension device. The force exerted by the weight of the tool onto the mobile tool retainers is thereby led via the female open-centered body of the tool clamp towards the clamp housing, and via the clamp housing to the remainder of the tool suspension device.

In the embodiment of FIG. 9 it is shown that the uppermost bearing 84 between the clamp housing and the female, open-centered body is within the lines of force. An alternative configuration of the bearings 84 is shown in FIG. 10, in which the two uppermost bearings 84 together lead said exerted force on the mobile tool retainers to the clamp housing.

Figure 11:
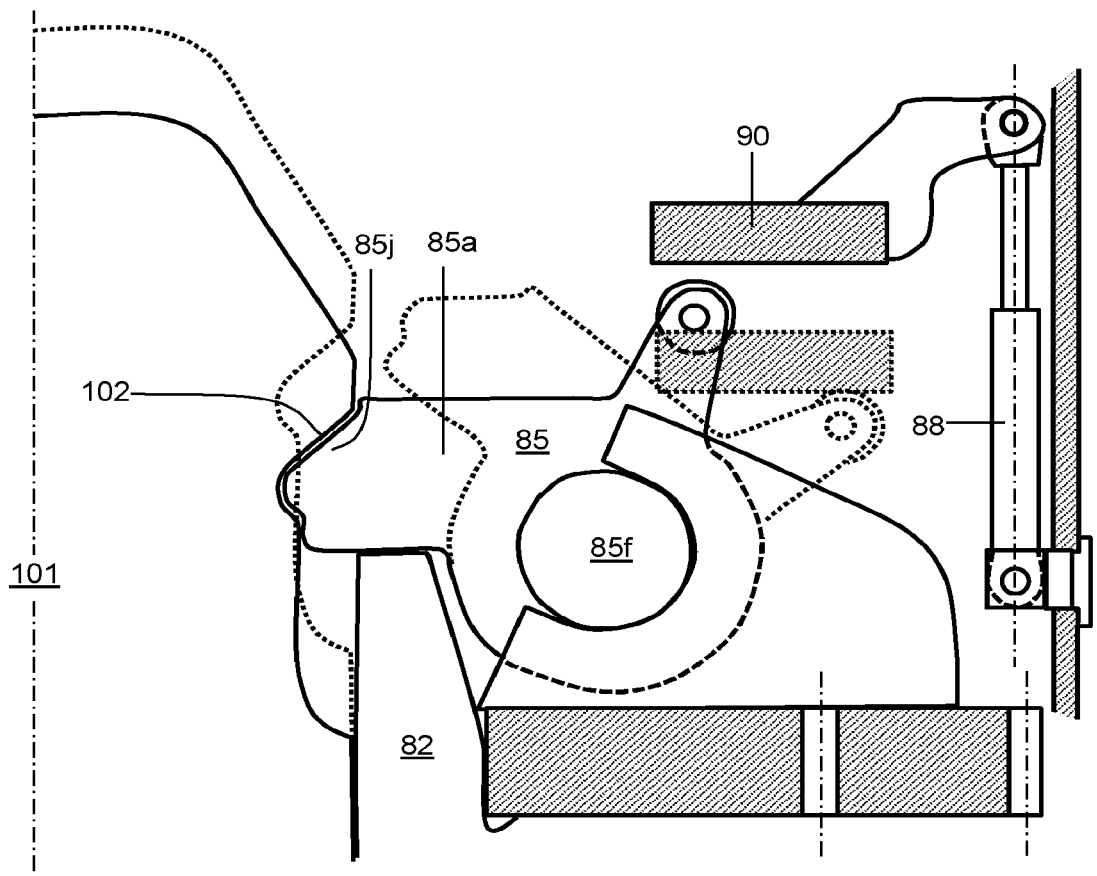

Not shown is that in the embodiments of FIGS. 11 and 12, the fulcrum of each mobile tool retainer 85 is mounted to the female open-centered body in a resilient manner via a resilient element, e.g. via springs or a resilient material, such that in the operative position, radial forces exerted on the mobile tool retainer by the shoulder 102 of the shank, because of the weight of the tool suspended therefrom, result in a compression of the resilient element, in order to reduce or substantially avoid material tension in the radially more outward solid parts of the tool clamp. This is especially advantageous in these embodiments, as here the interface between the arms 85*a* of the mobile tool retainers 85 and the female open-centered body is horizontal—ensuing substantially larger radial forces to the mobile tool retainers due to the weight of the tool.

What is claimed is:

1. A system comprising a crane, a male-to-male adapter and multiple exchangeable tools,
   wherein the crane comprises a hoist assembly, comprising one or more hoist winches and one or more hoist cables, driven by the one or more hoist winches,
   the crane further comprising a tool suspension device with a travelling block member, suspended from the one or more winch driven hoist cables of the hoist assembly, the travelling block member comprising multiple cable sheaves through which the one or more hoisting cables are run so that the tool suspension device is suspended by the one or more winch driven cables in a multiple fall arrangement,
   each exchangeable tool comprising at an upper side thereof a female tool counterconnector that is configured to be mated with the male-to-male adapter; the multiple exchangeable tools each have an identical female tool counterconnector allowing to suspend the exchangeable tools from the same tool suspension device;
   wherein the male-to-male adapter comprises a shank with a shoulder at an upper side of the shank and a male tool connector at the lower end of the shank; the male tool connector being configured to mate with the female tool counterconnector of the exchangeable tool;
   the tool suspension device further comprising a tool clamp comprising:
   a) one or more mobile retainers, adapted to releasably engage the shoulder of the shank of the male-to-male adapter so as to suspend the male-to-male adapter underneath the tool suspension device; the tool clamp further comprising:
   b) a clamp housing being supported pivotally by the travelling block member around a substantially horizontal connector pivot axis extending through the travelling block member below the mobile tool retainers, such as to allow a pivoting of the tool clamp around the connector pivot axis, and to absorb the load of the suspended male-to-male adapter mated with the exchangeable tool, and any load supported by the exchangeable tool; the tool clamp further comprising:
   c) a female, open-centered body defining a shank receiving passage with a central vertical axis allowing introduction of the shoulder of the male-to-male adapter into the passage from below, each mobile tool retainer being mounted on the female, open-centered body, and the mobile tool retainers being distributed around the shank receiving passage, so as to each provide an operative and a non-operative position of the mobile tool retainer, the mobile tool retainers being adapted to—in a non-operative position—allow introduction of the shank of the male-to-male adapter from below into the receiving passage and—in an operative position—engage below the shoulder of the shank that has been introduced into the passage so as to suspend the male-to-male adapter mated with the exchangeable tool from the tool clamp; the tool clamp further comprising
   d) a bearing mounted between the clamp housing and the female, open-centered body, said bearing supporting the female, open-centered body so as to allow for swivelling of the female, open-centered body with the tool retainers, and thereby the exchangeable tool if mated with the male-to-male adapter and if the male-to-male adapter is engaged by the tool retainers, about a vertical axis of the clamp housing relative to the clamp housing; the tool clamp further comprising:
   e) a rotational drive operative between the clamp housing and the female, open-centered body and configured to selectively drive said swivelling of the female, open-centered body and of the mobile tool retainers mounted thereon, and thereby of the exchangeable tool, relative to the clamp housing about the central vertical axis of the tool clamp.

2. The system according to claim 1, the travelling block member comprising a travelling block outer frame which defines an outer contour of the travelling block member, the travelling block outer frame comprising two traverse frame elements, which—when seen in a top view of the tool suspension device—horizontally enclose the tool clamp and also one or more cable sheaves of the travelling block member, both traverse frame elements comprising said recesses horizontally opposite one another, which are arranged such as to retain the tool clamp—when seen in a top view of the tool suspension device—substantially within an outer contour of the travelling block member.

3. The system according to claim 1, wherein the travelling block member comprises one or more recesses and wherein the clamp housing comprises two horizontally aligned axle ends arranged below the mobile tool retainers and being supported pivotally by the recesses in the travelling block member to support the tool clamp pivotally with respect to the travelling block and—when seen in a top view of the tool suspension device—horizontally in between cable sheaves of the travelling block member.

4. The system according to claim 1, wherein the rotational drive of the tool clamp comprises an operable clutch allowing to switch between a coupled condition and a freewheeling condition, wherein a driving torque of a driving shaft of the rotational drive generated by the rotational drive is transmitted to the female open-centered body on which the tool retainers are mounted via the clutch, the clutch being externally switchable to couple and decouple the driving shaft to and from the female open-centered body, respectively, such that the swivelling of the female open-centered body, is driven by, and freewheels from, the rotational drive, respectively.

5. The system according to claim 1, wherein the rotational drive comprises a differential with an operable brake, which in an inactive condition allows for, and in an active condition blocks the rotational drive to transmit a driving torque of a driving shaft of the rotational drive generated by the rotational drive to the female, open-centered body, via the differential, respectively, such that in said inactive condition and active condition the rotation of the female, open-centered body, is driven by, and freewheels from the rotational drive, respectively.

6. The system according to claim 1, wherein the mobile tool retainers are fixedly attached to a cogwheel which is engaged by one or more gears transmitting a driving torque of the rotational drive for driving the swivelling of the mobile tool retainers, wherein the cogwheel is an outwardly cogged cogwheel enclosing or being formed by the outer circumference of the female, open-centered body.

7. The system according to claim 1, wherein the tool clamp is provided with sensors and/or imaging devices configured for determining and/or recording locations and/or positions and/or displacements and/or mechanical parameters such as strain, of parts of the tool clamp, and/or the shank, provided with a data connection to a digital monitoring system for monitoring a correct operation of the tool clamp, that is, at least, to facilitate an engagement by the tool retainers of the shank, of the exchangeable tool so as to suspend the exchangeable tool from the tool clamp.

8. The system according to claim 1, wherein electrical power and/or data, if employed by the tool clamp, are transferred therefrom by means of wet-mate inductive connectors.

9. The system according to claim 1, wherein the exchangeable tool is a crane hook, a Ramshorn hook, or a four-pronged hook, or a monopile upending and lifting tool, or a pile driver lifting tool, or a pile driver.

10. The system according to claim 1, wherein the crane further comprises
a revolving structure,
a boom, pivotally mounted to the revolving structure,
a luffing assembly configured for luffing of the boom.

11. A system comprising a crane and multiple exchangeable tools, each exchangeable tool comprising at an upper side thereof a shank with a shoulder at an upper side of the shank;
wherein the crane comprises a hoist assembly, comprising one or more hoist winches and one or more hoist cables, driven by the one or more hoist winches,
the crane further comprising a tool suspension device with a travelling block member, suspended from the one or more winch driven hoist cables of the hoist assembly, the travelling block member comprising multiple cable sheaves through which the one or more hoisting cables are run so that the tool suspension device is suspended by the one or more winch driven cables in a multiple fall arrangement,
the tool suspension device further comprising a tool clamp comprising:
a) one or more mobile retainers, adapted to releasably engage the shoulder of the shank of exchangeable tool so as to suspend the exchangeable tool underneath the tool suspension device; the multiple exchangeable tools each have an identical shank with shoulder, allowing to suspend the exchangeable tools from the same tool suspension device; the tool clamp further comprising:
b) a clamp housing being supported pivotally by the travelling block member around a substantially horizontal connector pivot axis extending through the travelling block member below the mobile tool retainers, such as to allow a pivoting of the tool clamp around the connector pivot axis, and to absorb the load of the suspended exchangeable tool, and any load supported by the exchangeable tool; the tool clamp further comprising:
c) a female, open-centered body defining a shank receiving passage with a central vertical axis allowing introduction of the shoulder of the exchangeable tool into the passage from below, each mobile tool retainer being mounted on the female, open-centered body, and the mobile tool retainers being distributed around the shank receiving passage, so as to each provide an operative and a non-operative position of the mobile tool retainer, the mobile tool retainers being adapted to—in a non-operative position—allow introduction of the shank of the exchangeable tool from below into the receiving passage and—in an operative position—engage below the shoulder of the shank that has been introduced into the passage so as to suspend the exchangeable tool from the tool clamp; the tool clamp further comprising
d) a bearing mounted between the clamp housing and the female, open-centered body, said bearing supporting the female, open-centered body so as to allow for swivelling of the female, open-centered body with the tool retainers, and thereby the exchangeable tool if engaged by the tool retainers, about a vertical axis of the clamp housing relative to the clamp housing; the tool clamp further comprising:
e) a rotational drive operative between the clamp housing and the female, open-centered body and configured to selectively drive said swivelling of the female, open-centered body and of the mobile tool retainers mounted thereon, and thereby of the exchangeable tool, relative to the clamp housing about the central vertical axis of the tool clamp.

12. The system according to claim 11, the travelling block member comprising a travelling block outer frame which defines an outer contour of the travelling block member, the travelling block outer frame comprising two traverse frame elements, which—when seen in a top view of the tool suspension device—horizontally enclose the tool clamp and also one or more cable sheaves of the travelling block member, both traverse frame elements comprising said recesses horizontally opposite one another, which are arranged such as to retain the tool clamp—when seen in a top view of the tool suspension device—substantially within an outer contour of the travelling block member.

13. The system according to claim 11, wherein the travelling block member comprises one or more recesses and wherein the clamp housing comprises two horizontally aligned axle ends arranged below the mobile tool retainers and being supported pivotally by the recesses in the travelling block member to support the tool clamp pivotally with respect to the travelling block and—when seen in a top view of the tool suspension device—horizontally in between cable sheaves of the travelling block member.

14. The system according to claim 11, wherein the rotational drive of the tool clamp comprises an operable clutch allowing to switch between a coupled condition and a freewheeling condition, wherein a driving torque of a driving shaft of the rotational drive generated by the rotational drive is transmitted to the female open-centered body on which the tool retainers are mounted via the clutch, the clutch being externally switchable to couple and decouple the driving shaft to and from the female open-centered body, respectively, such that the swivelling of the female open-centered body, is driven by, and freewheels from, the rotational drive, respectively.

15. The system according to claim 11, wherein the rotational drive comprises a differential with an operable brake, which in an inactive condition allows for, and in an active condition blocks the rotational drive to transmit a driving torque of a driving shaft of the rotational drive generated by the rotational drive to the female, open-centered body, via the differential, respectively, such that in said inactive condition and active condition the rotation of the female, open-centered body, is driven by, and freewheels from the rotational drive, respectively.

16. The system according to claim 11, wherein the mobile tool retainers are fixedly attached to a cogwheel which is engaged by one or more gears transmitting a driving torque of the rotational drive for driving the swivelling of the mobile tool retainers, wherein the cogwheel is an outwardly cogged cogwheel enclosing or being formed by the outer circumference of the female, open-centered body.

17. The system according to claim 11, wherein the tool clamp is provided with sensors and/or imaging devices configured for determining and/or recording locations and/or positions and/or displacements and/or mechanical parameters such as strain, of parts of the tool clamp, and/or the shank, provided with a data connection to a digital monitoring system for monitoring a correct operation of the tool clamp, that is, at least, to facilitate an engagement by the tool retainers of the shank, of the exchangeable tool so as to suspend the exchangeable tool from the tool clamp.

18. The system according to claim 11, wherein electrical power and/or data, if employed by the tool clamp, are transferred therefrom by means of wet-mate inductive connectors.

19. The system according to claim 11, wherein the exchangeable tool is a crane hook, a Ramshorn hook, or a four-pronged hook, or a monopile upending and lifting tool, or a pile driver lifting tool, or a pile driver.

20. The system according to claim 11, wherein the crane further comprises a revolving structure,
a boom, pivotally mounted to the revolving structure,
a luffing assembly configured for luffing of the boom.

* * * * *